（12） United States Patent
Iwata

(10) Patent No.: US 7,920,890 B2
(45) Date of Patent: Apr. 5, 2011

(54) TRANSMISSION POWER CONTROL METHOD AND APPARATUS OF MOBILE COMMUNICATION TERMINAL

(75) Inventor: Kohki Iwata, Isehara (JP)

(73) Assignee: Anritsu Corporation, Atsugi-shi (JP)

( * ) Notice: Subject to any disclaimer, the term of this patent is extended or adjusted under 35 U.S.C. 154(b) by 515 days.

(21) Appl. No.: 12/152,033

(22) Filed: May 12, 2008

(65) Prior Publication Data

US 2008/0227479 A1  Sep. 18, 2008

Related U.S. Application Data

(63) Continuation of application No. PCT/JP2007/071041, filed on Oct. 29, 2007.

(30) Foreign Application Priority Data

Oct. 30, 2006 (JP) ................................ 2006-294926
Apr. 27, 2007 (JP) ................................ 2007-119465

(51) Int. Cl.
H04B 7/185 (2006.01)
H04B 7/00 (2006.01)
H04W 36/00 (2009.01)

(52) U.S. Cl. ........ 455/522; 455/509; 455/515; 455/516; 455/442; 370/318

(58) Field of Classification Search .................. 455/509, 455/515, 516, 442, 522; 370/318
See application file for complete search history.

(56) References Cited

U.S. PATENT DOCUMENTS

2003/0078010 A1\* 4/2003 Davis .............................. 455/69

(Continued)

FOREIGN PATENT DOCUMENTS

JP 2003-510950 A 3/2003

(Continued)

OTHER PUBLICATIONS

3rd Generation Partnership Project: Technical Specification Group Radio Access Network; Physical Layer Procedures (FDD) (Release 6); 3GPP TS 25.214 V.610.0 (Sep. 2006).

(Continued)

Primary Examiner — Matthew D Anderson
Assistant Examiner — Bobbak Safaipour
(74) Attorney, Agent, or Firm — Holtz, Holtz, Goodman & Chick, PC

(57) ABSTRACT

A transmission power increasing section continuously transmits, from a testing instrument to a mobile communication terminal at predetermined intervals, a transmission power increasing request for increasing transmission power of the mobile communication terminal by a predetermined quantity. A block size extracting section extracts, from a predetermined second physical channel, block size information indicating a block size of transmittable data defined in association with the maximum transmission power set at a first physical channel upon receipt of a plurality of physical channels from the mobile communication terminal for each transmission of the transmission power increasing request. A storage section stores, at least one time, block size information extracted at the block size extracting section. In the case where a value of newly extracted block size information in the block size extracting section is decreased below a value of immediately preceding block size information stored in the storage section as a result of comparison therebetween, the maximum output power state determining section stops transmission of the transmission power increasing request in the transmission power increasing section and transmits, to the mobile communication terminal, a transmission power decreasing request for decreasing transmission power of the mobile communication terminal by a predetermined quantity.

40 Claims, 22 Drawing Sheets

U.S. PATENT DOCUMENTS

| | | | |
|---|---|---|---|
| 2003/0104831 A1* | 6/2003 | Razavilar et al. | 455/522 |
| 2004/0116144 A1* | 6/2004 | Shapira | 455/522 |
| 2005/0037761 A1* | 2/2005 | Baker et al. | 455/442 |
| 2005/0113127 A1* | 5/2005 | Zhang et al. | 455/522 |
| 2006/0199603 A1* | 9/2006 | Hart et al. | 455/522 |
| 2007/0127407 A1* | 6/2007 | Attar et al. | 370/318 |
| 2008/0200201 A1* | 8/2008 | Jonsson | 455/522 |
| 2009/0154403 A1* | 6/2009 | Niwano | 370/329 |

FOREIGN PATENT DOCUMENTS

| | | |
|---|---|---|
| JP | 2003-516062 A | 5/2003 |
| JP | 2005-109992 A | 4/2005 |
| WO | WO 01/24402 A1 | 4/2001 |

OTHER PUBLICATIONS

3$^{rd}$ Generation Partnership Project: Technical Specification Group Radio Access Network; Multiplexing and Channel Coding (FDD); (Release 6); 3GPP TS 25.212 V6.9.0. (Sep. 2006).

3$^{rd}$ Generation Partnership Project: Technical Specification Group Radio Access Network; User Equipment (UE) Conformance Specification; Radio Transmission and Reception (FDD); Part 1; Conformance Specification (Release 7); 3GPP TS 34.121-1 V7.2.0. (Oct. 2006).

3$^{rd}$ Generation Partnership Project: Technical Specification Group Radio Access Network; User Equipment (UE) Radio Transmission and Reception (FDD); (Release 6); 3GPP TS 25.101 v6.13.0 (Oct. 2006).

ANRITSU Product Information; ME7873F; ME7874F; Jan. 21, 2008.

International Preliminary Report on Patentability and Written Opinion of the International Searching Authority dated Jun. 4, 2009 (6 pages), issued in counterpart International application No. PCT/JP2007/071041.

An English language Translation of the International Search Report dated Jan. 29, 2008, issued in a counterpart International Application.

* cited by examiner

| Physical channel | Power value | Amplitude value | Specified value from base station |
|---|---|---|---|
| E-DPDCH | Ped | $\beta ed$ | $(Aed)^2 = (\beta ed / \beta c)^2$ |
| E-DPCCH | Pec | $\beta ec$ | $Aec = \beta ec / \beta c$ |
| HS-DPCCH | Phs | $\beta hs$ | $Ahs = \beta hs / \beta c$ |
| DPDCH | Pd | $\beta d$ | $\beta d$ |
| DPCCH | Pc | $\beta c$ | $\beta c$ |

FIG. 4

| Number | E-TFCI number | $\beta ed/\beta c$ |
|---|---|---|
| 1 | 11 | 9/15 |
| 2 | 83 | 38/15 |
| 3 | 110 | 53/15 |
| 4 | 115 | 67/15 |

FIG. 5

| TPC algorithm mode | TPC command (columns) | Operation of mobile communication terminal |
|---|---|---|
| 1 | 0 | Decreasing DPCCH power by one unit |
| 1 | 1 | Increasing DPCCH power by one unit |
| 2 | 00000 | Decreasing DPCCH power by one unit |
| 2 | 11111 | Increasing DPCCH power by one unit |
| 2 | Combination other than the above | Maintaining current power |

FIG. 6

E − DPCCH(uplink)

(a) 1 block (10 bits): E − TFCI (7bit) | Happy Bit (1bit) | RSH (2bit)

E-TFCI (transmission quantity information)

(b)

| E − TFCI | Transmission block size |
|---|---|
| 0 | 18 |
| 1 | 120 |
| 2 | 124 |
| 3 | 130 |
| ⋮ | ⋮ |
| 126 | 19204 |
| 127 | 20000 |

FIG. 7

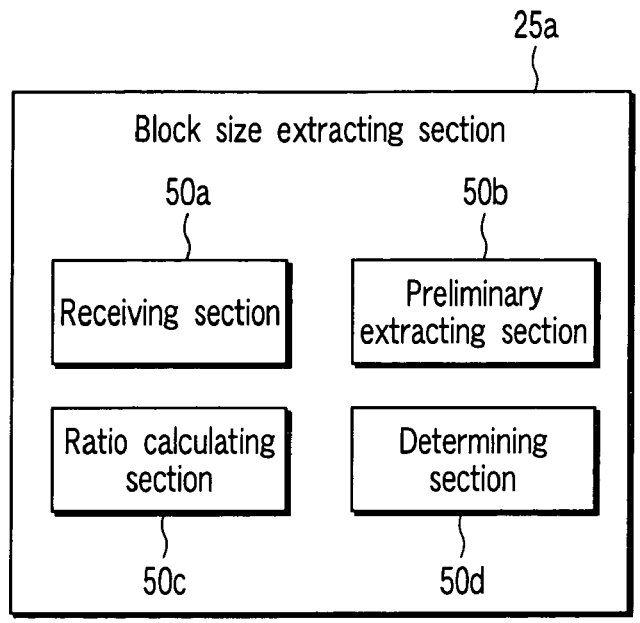
F I G. 20
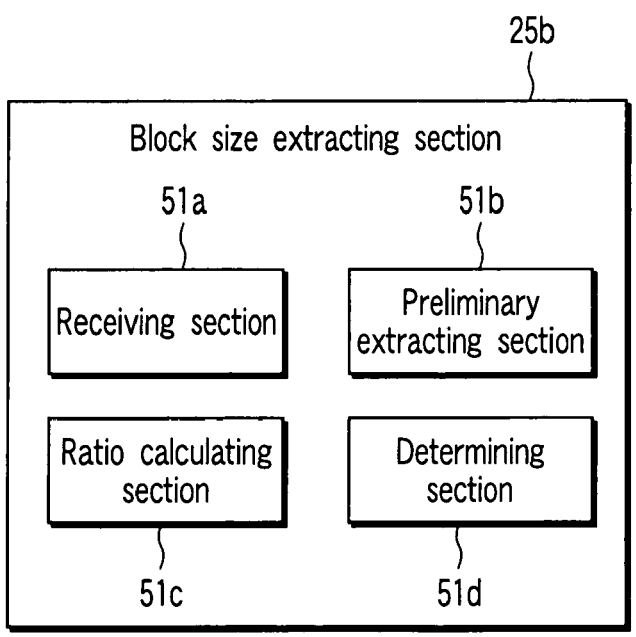
F I G. 21

| E-TFCI | Data block size (bits) | $\beta ed/\beta c$ | Number of data units contained Data unit bit number = At 336 bits |
|---|---|---|---|
| 44 | 687 | 17/15 | 1 |
| 45 | 716 | 17/15 | 2 |
| 46 | 745 | 17/15 | 2 |
| 47 | 776 | 17/15 | 2 |
| 48 | 809 | 19/15 | 2 |
| 49 | 842 | 19/15 | 2 |
| 50 | 877 | 19/15 | 2 |
| 51 | 913 | 19/15 | 2 |
| 52 | 951 | 19/15 | 2 |
| 53 | 991 | 21/15 | 2 |
| 54 | 1032 | 21/15 | 3 |
| 55 | 1074 | 21/15 | 3 |
| 56 | 1119 | 21/15 | 3 |
| 57 | 1165 | 21/15 | 3 |
| 58 | 1214 | 21/15 | 3 |
| 59 | 1264 | 21/15 | 3 |
| 60 | 1316 | 24/15 | 3 |
| 61 | 1371 | 24/15 | 4 |
| 62 | 1428 | 24/15 | 4 |
| 63 | 1487 | 24/15 | 4 |
| 64 | 1549 | 24/15 | 4 |
| 65 | 1613 | 24/15 | 4 |
| 66 | 1680 | 27/15 | 4 |
| 67 | 1749 | 27/15 | 5 |
| 68 | 1822 | 27/15 | 5 |
| 69 | 1897 | 27/15 | 5 |
| 70 | 1976 | 27/15 | 5 |
| 71 | 2058 | 30/15 | 6 |
| 72 | 2143 | 30/15 | 6 |
| 73 | 2232 | 30/15 | 6 |
| 74 | 2325 | 30/15 | 6 |
| 75 | 2421 | 30/15 | 7 |

F I G. 23

| Quantized aed | Quantized aed (String) |
|---|---|
| 0.333333333 | 5/15 |
| 0.4 | 6/15 |
| 0.466666667 | 7/15 |
| 0.533333333 | 8/15 |
| 0.6 | 9/15 |
| 0.733333333 | 11/15 |
| 0.8 | 12/15 |
| 0.866666667 | 13/15 |
| 1 | 15/15 |
| 1.133333333 | 17/15 |
| 1.266666667 | 19/15 |
| 1.4 | 21/15 |
| 1.6 | 24/15 |
| 1.8 | 27/15 |
| 2 | 30/15 |
| 2.266666667 | 34/15 |
| 2.533333333 | 38/15 |
| 2.8 | 42/15 |
| 3.133333333 | 47/15 |
| 3.533333333 | 53/15 |
| 4 | 60/15 |
| 4.466666667 | 67/15 |
| 5 | 75/15 |
| 5.6 | 84/15 |
| 6.333333333 | 95/15 |
| 7.066666667 | 106/15 |
| 7.933333333 | 119/15 |
| 8.933333333 | 134/15 |
| 10 | 150/15 |
| 11.2 | 168/15 |

(a)

| E-TFCI | PO=Aed |
|---|---|
| 11 | 0.6 |
| 83 | 2.53333333 |
| 110 | 3.53333333 |
| 115 | 4.46666667 |

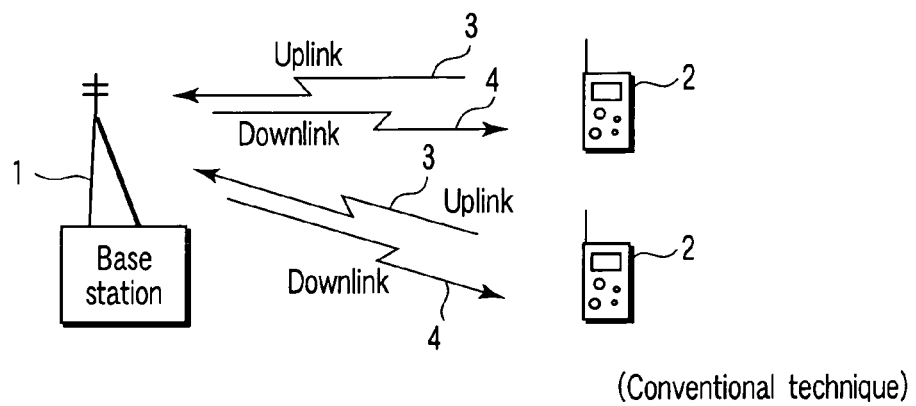
(Conventional technique)
F I G. 25
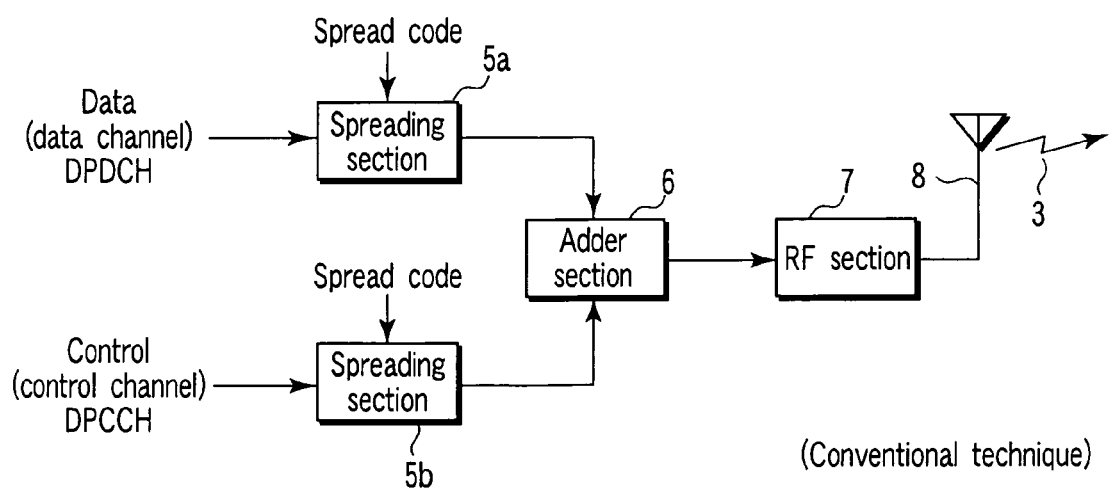
(Conventional technique)
F I G. 26

(Conventional technique)

PMAX: Maximum output power (Conventional technique)

TRANSMISSION POWER CONTROL METHOD AND APPARATUS OF MOBILE COMMUNICATION TERMINAL

CROSS REFERENCE TO RELATED APPLICATIONS

This is a Continuation Application of PCT Application No. PCT/JP2007/071041, filed Oct. 29, 2007, which was published under PCT Article 21(2) in Japanese.

This application is based upon and claims the benefit of priority from prior Japanese Patent Applications No. 2006-294926, filed Oct. 30, 2006; and No. 2007-119465, filed Apr. 27, 2007, the entire contents of both of which are incorporated herein by reference.

BACKGROUND OF THE INVENTION

1. Field of the Invention

The present invention relates to a transmission power control method and apparatus for setting a maximum output power state of a mobile communication terminal by means of a simulative base station unit (testing instrument) for testing the mobile communication terminal such as a cellular phone.

2. Description of the Related Art

As is well known, a W-CDMA (Wideband Code Division Multiple Access) is proposed as one of the radio communication approach in a third-generation mobile communication system.

Further, while this W-CDMA is employed as a base, there has been made the standardization of HSDPA (High Speed Downlink Packet Access) of a 3.5-th generation mobile communication system (3.5G) in which a packet communication speed is increased.

Moreover, in response to this HSDPA, there has been discussed the standardization of a communication scheme of the HSUPA (High Speed Uplink Packet Access) that enables an uplink function and high speed data communication.

In this HSUPA communication approach, as shown in FIG. 25, communication is made between a base station 1 and a mobile communication terminal 2 of each user, and in signals to be transmitted and received, data and control information to be transmitted and received are multiplexed and incorporated.

In other words, in FIG. 25, a signal to be transmitted from the mobile communication terminal 2 to the base station 1 is an uplink signal (Uplink) 3, and a signal to be transmitted from the base station 1 to the mobile communication terminal 2 is a downlink signal (Downlink) 4.

FIG. 26 is a schematic block diagram depicting procedures for generating the uplink signal 3 in the W-CDMA communication approach.

In other words, as shown in FIG. 26, a data channel DPDCH (Dedicated Physical Data Channel) including data to be transmitted and a control channel DPCCH (Dedicated Physical Control Channel) including control information each are input to an adder section 6 after spectrum-spread by means of spread codes specified at spreading sections 5a and 5b.

Further, the output added at the adder section 6 is produced as a radio wave to be on the air from an antenna 8 after converted to a high frequency wave at a high frequency section (RF section) 7.

FIG. 27 is a schematic block diagram depicting procedures for generating uplink signals in the communication approaches HSDPA and HSUPA.

In other words, as shown in FIG. 27, in addition to the W-CDMA data channel DPDCH and the control channel DPCCH mentioned previously, the uplink signals in the communication approaches HSDPA and HSUPA incorporate a total of five physical channels, i.e., a control channel HS-DPCCH (High speed Dedicated Physical Control Channel) exerted by an extended HSDPA; an HSUPA data channel E-DPDCH (Enhanced Dedicated Physical Data Channel); a control channel E-DPCCH (Enhanced Dedicated Physical Control Channel). These channels each are input to the adder section 6 after spectrum-spread by means of the spread codes specified at the spreading sections 5a, 5b, 5c, 5d, and 5e.

The data channel and the control channel configure physical channels.

Then, these five physical channels, as shown in FIG. 28, are individually provided for each of the uplink signal (uplink) 3 and the downlink signal (downlink) 4, and physical channels 9 of the uplink signal (uplink) 3 and physical channels 10 of the downlink signal (downlink) 4 are set at their different frequency bandwidths.

Here, the uplink signal (uplink) 3 includes five physical channels 9, each of which is code-multiplexed, and thus, the physical channels 9 each are stacked in a power direction, as illustrated.

In this case, the important thing is that the total transmission power of the five physical channels 9 of the uplink signal (uplink) 3 to be output from the mobile communication terminal 2 to the base station 1 is defined in the 3GPP (3rd Generation Partnership Project) standard so as not to exceed the predetermined maximum output power PMAX.

In other words, in "6.2.1 UE maximum output power" described in 3GPP TS25. 101 of non-patent document 1 serving as the 3GPP standard, in the case of the W-CDMA communication approach, the maximum output power of the mobile communication terminal 2 is standardized at +33 dBm to +21 dBm into power classes 1 to 4 in accordance with a mobile communication terminal class (UE Power class).

As described previously, in the case where a technique of a new communication approach is standardized, it is necessary to test whether or not a mobile communication terminal developed in order to achieve the communication approach conforms to the performance specified by the standard for the communication approach.

One of the tests of the mobile communication terminals is a test relating to the Maximum Output Power to be measured as the maximum output state of the transmission power described previously, and is specified in "5.2 Maximum Output Power" described in 3GPP TS34. 121-1 of non-patent document 2 serving as the 3GPP standard.

In patent document 1, there is disclosed a technique of controlling transmission power of channels and transmission power of the entire mobile communication terminal, based on a data transmission speed (data rate) of data channels in the mobile communication terminal.

Non-patent document 1: 3GPP TS25. 101 V6.13.0 (2006-10)

Non-patent document 2: 3GPP TS34. 121-1 V7.2.0 (2006-10)

Patent document 1: Jpn. Pat. Appln. KOKAI Publication No. 2003-510950

BRIEF SUMMARY OF THE INVENTION

In the meantime, with adoption of the HSUPA communication approach described previously, a data channel E-DPDCH and a control channel E-DPCCH are newly added to the uplink signal (uplink) 3.

The added E-DPCCH includes information (E-TFCI: hereinafter, referred to as data size information or block size information) representative of a size (block size) of data that can be transmitted at one time by means of the added E-DPDCH.

The data size that can be transmitted by means of this E-DPDCH at one time is proportional to transmission power generated by means of the E-DPDCH alone.

In actual communication, in response to a radio wave situation, the transmission power of the physical channels is controlled so that communication is made at the maximum power efficiency in that situation.

However, as described previously, the maximum output power PMAX in transmission power of the entire physical channels 9 multiplexed is predetermined so that transmission power cannot be set to be greater than the maximum output power PMAX.

In non-patent document 2 serving as the 3GPP standard, in order to ensure stability in communication between a control channel (for example, DPCCH) and a data channel (for example, DPDCH) that are mandatory from the mobile communication terminal 2, the mobile communication terminal 2 may be requested to further increase transmission power from the base station 1 in a state in which transmission has already been carried out at the maximum output power PMAX.

In other words, in the case where a mandatory channel receiving state seems to be still poor, the base station 1 reduces transmission power of the E-DPDCH alone, and carries out control of increasing transmission power of the mandatory control channel (DPCCH) and data channel (DPDCH) (power adaptive control).

A testing instrument for testing the mobile communication terminal 2 having such power adaptive function is referred to as a simulative base station unit (base station simulator); has an essential function of simulating the base station 1; and tests the mobile communication terminal 2 based on the scenario in which communication procedures have been described in advance.

In addition, testing of the mobile communication terminal having such power adaptive function is standardized in "5.2B Maximum Output power with HS-DPCCH and E-DCH" described in non-patent document 2 serving as the 3GPP standard mentioned previously.

In the specification described in non-patent document 2 serving as the 3GPP standard, it is required for the physical channels (DPCCH, DPDCH, HS-DPCCH, E-DPCCH, and E-DPDCH) to output transmission power of the mobile communication terminal 2 at a predetermined given transmission power rate, and there occurs a problem that if the power adaptive control described previously is carried out at the mobile communication terminal 2, the rate is abnormally set.

This problem occurs because information on what rate the transmission powers of the physical channels 9 at the mobile communication terminal 2 are transmitted in response to a request for increasing transmission power from the testing instrument is not delivered to the testing instrument.

Methods for solving the problem described above include a method for measuring a signal between the mobile communication terminal 2 and the testing instrument with the use of a power gauge.

Nevertheless, with this method, there occurs a problem that it takes long to set a current state at a desired state because the measurement speed of the power gauge is slow with respect to transmission intervals of the request for increasing transmission power described previously (for example, intervals of 10 ms). In addition, in such a power gauge, because of its structure, there is a problem that it is very difficult to measure the code division multiplexed transmission power of physical channels of the mobile communication terminal 2 within a short period of time.

In addition, in this method, because of errors of the power gauge and influence of a measurement system, there is a problem that assurance that a transmission power ratio between the physical channels in the mobile communication terminal 2 is set in a desired state cannot be obtained at a time point at which the maximum output power PMAX specified in the standard has been measured.

Further, in the test relating to "5.2 Maximum Output Power" described in non-patent document 2 serving as the 3GPP standard mentioned previously, it is required to measure transmission power within a short period of time.

Therefore, it is required to measure, at intervals of 10 ms or at intervals of 2 ms, a block size corresponding to transmission power of data on the data channel E-DPDCH of the uplink signal (uplink) of the mobile communication terminal 2.

However, in this technique as well, there is a problem that it is difficult to directly measure (count) the block size of data on the data channel E-DPDCH at intervals of 10 ms or at intervals of 2 ms.

The present invention has been made to solve the problems with the conventional technique, as described above. It is an object of the present invention to provide a transmission power control method and apparatus of a mobile communication terminal, which are capable of measuring, in a short period or time and precisely, a state of the maximum output power set at the mobile communication terminal in a state in which a transmission power ratio between the physical channels is specified at the mobile communication terminal.

In order to achieve the above-described object, according to a first aspect of the present invention, there is provided a transmission power control method of a mobile communication terminal, in a communication approach for controlling total power of transmission power of each of a plurality of physical channels (9) output from the mobile communication terminal (11) which exchanges information on the plurality of physical channels (9) with a base station using a code division multiple access by adjusting a block size of data that can be transmitted by means of predetermined specific physical channels so as not to exceed a predetermined maximum output power, for setting an output state of transmission power from the mobile communication terminal (11) at the predetermined maximum output power by means of a testing instrument (12) connected to the mobile communication terminal in place of the base station, the method comprising:

a use channel setting step (S1) of transmitting and setting, from the testing instrument (12) to the mobile communication terminal (11), types of the plurality of physical channels to be transmitted from the mobile communication terminal (11) to the testing instrument (12);

a transmission power ratio setting step (S2) of transmitting and setting, from the testing instrument (12) to the mobile communication terminal (11), transmittable maximum transmission power of a predetermined first physical channel from among the plurality of physical channels transmitted from the mobile communication terminal (11), and transmitting and setting, from the testing instrument (12) to the mobile communication terminal (11), a ratio of transmission power between each of physical channels other than the first physical channel from among the plurality of physical channels transmitted from the mobile communication terminal (11);

a communication establishing step (S3, S4) of establishing communication between the testing instrument (12) and the mobile communication terminal (11) in the testing instrument (12), and transmitting and setting, from the testing instrument (12) to the mobile communication terminal (11), transmission power so as to be a non-maximum transmission power state preset in the mobile communication terminal (11);

a transmission power increasing step (S5) of continuously transmitting, from the testing instrument (12) to the mobile communication terminal (11) at predetermined intervals, a transmission power increasing request for increasing transmission power of the mobile communication terminal (11) by predetermined quantity from the non-maximum transmission power;

a block size extracting step (S6) of receiving, by means of the testing instrument (17), the plurality of physical channels from the mobile communication terminal (11) relative to each transmission of the transmission power increasing request at the predetermined intervals of the transmission power increasing step (S5), and extracting, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage step (S7) of storing at least one time, the block size information extracted at the block size extracting step (S6) in the testing instrument (12); and a maximum output power state determining step (S8, S9) of, in the case where a value of newly extracted block size information in the block size extracting step (S6) is decreased below a value of immediately preceding block size information stored in the storage step as a result of comparing the value of the newly extracted block size information with the value of the immediately preceding block size information stored in the storage step (S7), stopping transmission of the transmission power increasing request in the transmission power increasing step (S5), and transmitting, to the mobile communication terminal (11), a transmission power decreasing request for decreasing transmission power of the mobile communication terminal (11) by a predetermined quantity.

In order to achieve the above-described object, according to a second aspect of the present invention, there is provided the transmission power control method of a mobile communication terminal according to the first aspect, wherein the block size extracting step (S6) comprises:

a receiving step of receiving a plurality of times a plurality of physical channels including the second physical channel in transmission intervals of each of transmission power increasing requests that are continuously transmitted at the predetermined intervals;

a preliminary extracting step of extracting the block size information respectively from the second physical channel included in the plurality of physical channels received a plurality of times in the receiving step, the extracted block size information each having any of predetermined two values, a smaller value being defined as a first reference value among the predetermined two values, the other value being defined as a second reference value;

a ratio calculating step of calculating a ratio between a total number of the block size information extracted in the preliminary extracting step and the number of block size information that is a value equal to the first reference value; and a determining step of, when the ratio calculated in the ratio calculating step is greater than a predetermined first threshold value, determining the first reference value as block size information extracted with respect to the transmission power increasing request, and when the ratio calculated in the ratio calculating step is equal to or smaller than the first threshold value, determining the second reference value as block size information extracted with respect to the transmission power increasing request.

In order to achieve the above-described object, according to a third aspect of the present invention, there is provided the transmission power control method of a mobile communication terminal according to the first aspect, wherein the block size extracting step (S6) comprises:

a receiving step of receiving a plurality of times a plurality of physical channels including the second physical channel in transmission intervals of each of transmission power increasing requests that are continuously transmitted at the predetermined intervals;

a preliminary extracting step of extracting the block size information respectively from the second physical channel included in the plurality of physical channels received a plurality of times in the receiving step, defining, as a first reference value, a minimum value of each of the extracted block size information, and defining, as a second reference value, a maximum value of each of the extracted block size information;

a ratio calculating step of calculating a ratio between a total number of the block size information extracted in the preliminary extracting step and the number of block size information that is a value equal to the first reference value or a value within a predetermined numeric value range relative to the first reference value; and a determining step of, when the ratio calculated in the ratio calculating step is greater than a predetermined first threshold value, determining the first reference value as block size information extracted with respect to the transmission power increasing request, and when the ratio calculated in the ratio calculating step is equal to or smaller than the first threshold value, determining the second reference value as block size information extracted with respect to the transmission power increasing request.

In order to achieve the above-described object, according to a fourth aspect of the present invention, there is provided the transmission power control method of a mobile communication terminal according to the first aspect, wherein, in the case where a value of the newly extracted block size information is decreased significantly below a predetermined second threshold value in comparison with a value of the immediately preceding block size information stored in the storage step, the maximum output power state determining step stops transmission of the transmission power increasing request in the transmission power increasing step (S5) and transmits, to the mobile communication terminal (11), the transmission power decreasing request for decreasing the transmission power of the mobile communication terminal (11) by a predetermined quantity.

In order to achieve the above-described object, according to a fifth aspect of the present invention, there is provided a transmission power control method of a mobile communication terminal, in a communication approach for controlling total power of transmission power of each of a plurality of physical channels (9) output from the mobile communication terminal (11) which exchanges information on the plurality of physical channels (9) with a base station using a code division multiple access by adjusting a block size of data that can be transmitted by means of predetermined specific physical channels so as not to exceed a predetermined maximum output power, for setting an output state of transmission power from the mobile communication terminal (11) at the predetermined maximum output power by means of a testing instrument (12) connected to the mobile communication terminal in place of the base station, the method comprising:

a use channel setting step (Q1) of transmitting and setting, from the testing instrument (12) to the mobile communication terminal (11), types of the plurality of physical channels to be transmitted from the mobile communication terminal (11) to the testing instrument (12);

a transmission power ratio setting step (Q2) of transmitting and setting, from the testing instrument (12) to the mobile communication terminal (11), transmittable maximum transmission power of a predetermined first physical channel from among the plurality of physical channels transmitted from the mobile communication terminal (11), and transmitting and setting, from the testing instrument (12) to the mobile communication terminal (11), a ratio of transmission power between each of physical channels other than the first physical channel from among the plurality of physical channels transmitted from the mobile communication terminal (11);

a communication establishing step (Q3) of establishing communication between the testing instrument (12) and the mobile communication terminal (11) in the testing instrument (12);

an excessively large adjustment state setting step (Q4) of providing, from the test instrument (12) to the mobile communication terminal (11), initial setting to an excessively large adjustment state in which adjustment is made with respect to transmission power of the each of the physical channels in a state in which total power of the transmission power has reached the predetermined maximum output power;

a transmission power decreasing step (Q5) of continuously transmitting, from the testing instrument (12) to the mobile communication terminal (11) at predetermined intervals, a transmission power decreasing request for decreasing transmission power of the mobile communication terminal (11) by a predetermined quantity from the excessively large adjustment state;

a block size extracting step (Q6) of receiving, by means of the testing instrument (12), the plurality of physical channels from the mobile communication terminal (11) relative to each transmission of the transmission power decreasing request at the predetermined intervals of the transmission power decreasing step (Q5), and extracting, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage step (Q7) of storing, at least one time, the block size information extracted in the block size extracting step (Q6) in the testing instrument (12);

a block size information judging step (Q8) of judging whether or not a value of newly extracted block size information in the block size extracting step (Q6) exceeds a preset value in the testing instrument (12); and a maximum output power state determining step (Q9, Q10) of, in the case where the value of the newly extracted block size information exceeds the preset value in the block size information judging step (Q8), comparing the value of the newly extracted block size information with a value of immediately preceding block size information stored in the storage step (Q7), and in the case where the value of the newly extracted block size information is equal to the value of the immediately preceding block size information stored in the storage step (Q7), stopping transmission of the transmission power decreasing request in the transmission power decreasing step (Q5), and transmitting, to the mobile communication terminal (11), a transmission power increasing request for increasing transmission power of the mobile communication terminal (11) by a predetermined quantity.

In order to achieve the above-described object, according to a sixth aspect of the present invention, there is provided the transmission power control method of a mobile communication terminal according to the fifth aspect, wherein the block size extracting step (Q6) comprises:

a receiving step of receiving a plurality of times a plurality of physical channels including the second physical channel in transmission intervals of each of transmission power decreasing requests that are continuously transmitted at the predetermined intervals;

a preliminary extracting step of extracting the block size information respectively from the second physical channel included in the plurality of physical channels received a plurality of times in the receiving step, the extracted block size information each having any of predetermined two values, a smaller value being defined as a first reference value among the predetermined two values, the other value being defined as a second reference value;

a ratio calculating step of calculating a ratio between a total number of the block size information extracted in the preliminary extracting step and the number of block size information that is a value equal to the second reference value; and a determining step of, when the ratio calculated in the ratio calculating step is greater than a predetermined first threshold value, determining the second reference value as block size information extracted with respect to the transmission power decreasing request, and when the ratio calculated in the ratio calculating step is equal to or smaller than the first threshold value, determining the first reference value as block size information extracted with respect to the transmission power decreasing request.

In order to achieve the above-described object, according to a seventh aspect of the present invention, there is provided the transmission power control method of a mobile communication terminal according to the fifth aspect, wherein the block size extracting step (Q6) comprises:

a receiving step of receiving a plurality of times a plurality of physical channels including the second physical channel in transmission intervals of each of transmission power decreasing requests that are continuously transmitted at the predetermined intervals;

a preliminary extracting step of extracting the block size information respectively from the second physical channel included in the plurality of physical channels received a plurality of times in the receiving step, defining, as a first reference value, a minimum value of each of the extracted block size information, and defining, as a second reference value, a maximum value of each of the extracted block size information;

a ratio calculating step of calculating a ratio between a total number of the block size information extracted in the preliminary extracting step and the number of block size information that is a value equal to the second reference value or a value within a predetermined numeric value range relative to the second reference value; and a determining step of, when the ratio calculated in the ratio calculating step is greater than a predetermined first threshold value, determining the second reference value as block size information extracted with respect to the transmission power decreasing request, and when the ratio calculated in the ratio calculating step is equal to or smaller than the first threshold value, determining the first reference value as block size information extracted with respect to the transmission power decreasing request.

In order to achieve the above-described object, according to an eighth aspect of the present invention, there is provided the transmission power control method of a mobile communication terminal according to the fifth aspect, wherein, in the case where the value of the newly extracted block size information is within a range of the value of the immediately preceding block size information stored in the storage step and a predetermined second threshold value, the maximum output power state determining step stops transmission of the transmission power decreasing request in the transmission power decreasing step (Q5) and transmits, to the mobile communication terminal (11), a transmission power increasing request for increasing transmission power of the mobile communication terminal (11) by a predetermined quantity.

In order to achieve the above-described object, according to a ninth aspect of the present invention, there is provided the transmission power control method of a mobile communication terminal according to any one of the first to eight aspects, wherein the communication approach is W-CDMA.

In order to achieve the above-described object, according to a tenth aspect of the present invention, there is provided the transmission power control method of a mobile communication terminal according to the ninth aspect, wherein the plurality of physical channels output from the mobile communication terminal (11) include at least DPCCH, E-DPCCH, and E-DPDCH.

In order to achieve the above-described object, according to an eleventh aspect of the present invention, there is provided the transmission power control method of a mobile communication terminal according to the tenth aspect, wherein the first physical channel is the E-DPDCH and the second physical channel is the E-DPCCH.

In order to achieve the above-described object, according to a twelfth aspect of the present invention, there is provided the transmission power control method of a mobile communication terminal according to the tenth aspect, wherein the block size information is E-TFCI (transfer quantity information) included in the E-DPCCH.

In order to achieve the above-described object, according to a thirteenth aspect of the present invention, there is provided the transmission power control method of a mobile communication terminal according to the tenth aspect, wherein the transmission power increasing request and the transmission power decreasing request are instructed by means of TPC bits included in DPCCH of a downlink or F-DPCH of the downlink, which is transmitted from the testing instrument (12) to the mobile communication terminal (11).

In order to achieve the above-described object, according to a fourteenth aspect of the present invention, there is provided a transmission power control apparatus of a mobile communication terminal, in a communication approach for controlling total power of transmission power of each of a plurality of physical channels (9) output from the mobile communication terminal (11) which exchanges information on the plurality of physical channels (9) with a base station using a code division multiple access by adjusting a block size of data that can be transmitted by means of predetermined specific physical channels so as not to exceed a predetermined maximum output power, for setting an output state of transmission power from the mobile communication terminal (11) at the predetermined maximum output power by means of a testing instrument (12) connected to the mobile communication terminal in place of the base station, the apparatus comprising:

a use channel setting section (20) which transmits and sets, from the testing instrument (12) to the mobile communication terminal (11), types of the plurality of physical channels to be transmitted from the mobile communication terminal (11) to the testing instrument (12);

a maximum transmission power setting section (21) which transmits and sets, from the testing instrument (12) to the mobile communication terminal (11), transmittable maximum transmission power of a predetermined first physical channel from among the plurality of physical channels transmitted from the mobile communication terminal (11);

a transmission power ratio setting section (22) which transmits and sets, from the testing instrument (12) to the mobile communication terminal (11), a ratio of transmission power between each of physical channels other than the first physical channel from among the plurality of physical channels transmitted from the mobile communication terminal (11);

a communication establishing section (24) which establishes communication between the testing instrument (12) and the mobile communication terminal (11), and transmits and sets, from the testing instrument (12) to the mobile communication terminal (11), transmission power so as to be a non-maximum transmission power state preset in the mobile communication terminal (11);

a transmission power increasing section (23) which continuously transmits, from the testing instrument (12) to the mobile communication terminal (11) at predetermined intervals, a transmission power increasing request for increasing transmission power of the mobile communication terminal (11) by a predetermined quantity from the non-maximum transmission power state;

a block size extracting section (25) which receives the plurality of physical channels from the mobile communication terminal (11) relative to each transmission of the transmission power increasing request at the predetermined intervals of the transmission power increasing section (23), and extracts, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage section (26) which stores, at least one time, the block size information extracted at the block size extracting section (25); and a maximum output power state determining section (27) which, in the case where a value of newly extracted block size information is decreased below a value of immediately preceding block size information stored in the storage section (26) as a result of comparison between the value of the newly extracted block size information in the block size extracting section (25) and the value of the immediately preceding block size information stored in the storage section (26), stops transmission of the transmission power increasing request at the transmission power increasing section (23) and transmits, to the mobile communication terminal (11), a transmission power decreasing request for decreasing transmission power of the mobile communication terminal (11) by a predetermined quantity.

In order to achieve the above-described object, according to a fifteenth aspect of the present invention, there is provided the transmission power control apparatus of a mobile communication terminal according to the fourteenth aspect, wherein the block size extracting section (25*a*) comprises:

a receiving section (50*a*) which receives a plurality of times a plurality of physical channels including the second physical channel in transmission intervals of each of transmission power increasing requests that are continuously transmitted at the predetermined intervals;

a preliminary extracting section (50*b*) which extracts the block size information respectively from the second physical channel included in the plurality of physical channels received a plurality of times in the receiving section (50*a*), the extracted block size information each having any of predetermined two values, a smaller value being defined as a first reference value among the predetermined two values, the other value being defined as a second reference value;

a ratio calculating section (50*d*) which calculates a ratio between a total number of the block size information extracted in the preliminary extracting section (50*b*) and the number of block size information that is a value equal to the first reference value; and a determining section (50*d*) which, when the ratio calculated in the ratio calculating section (50*d*) is greater than a predetermined first threshold value, determines the first reference value as block size information extracted with respect to the transmission power increasing request, and when the ratio calculated in the ratio calculating section (50*d*) is equal to or smaller than the first threshold value, determines the second reference value as block size information extracted with respect to the transmission power increasing request.

In order to achieve the above-described object, according to a sixteenth aspect of the present invention, there is provided the transmission power control apparatus of a mobile communication terminal according to the fourteenth aspect, wherein the block size extracting section (25*a*) comprises:

a receiving section (50*a*) which receives a plurality of times a plurality of physical channels including the second physical channel in transmission intervals of each of transmission power increasing requests that are continuously transmitted at the predetermined intervals;

a preliminary extracting section (50*b*) which extracts the block size information respectively from the second physical channel included in the plurality of physical channels received a plurality of times in the receiving section (50*a*), defines, as a first reference value, a minimum value of each of the extracted block size information, and defines, as a second reference value, a maximum value of each of the extracted block size information;

a ratio calculating section (50*d*) which calculates a ratio between a total number of block size information extracted in the preliminary extracting section (50*b*) and the number of block size information that is a value equal to the first reference value or a value within a predetermined numeric value range relative to the first reference value; and a determining section (50*d*) which, when the ratio calculated in the ratio calculating section (50*d*) is greater than a predetermined first threshold value, determines the first reference value as block size information extracted with respect to the transmission power increasing request, and when the ratio calculated in the ratio calculating section (50*d*) is equal to or smaller than the first threshold value, determines the second reference value as block size information extracted with respect to the transmission power increasing request.

In order to achieve the above-described object, according to a seventeenth aspect of the present invention, there is provided the transmission power control apparatus of a mobile communication terminal according to the fourteenth aspect, wherein, in the case where the value of the newly extracted block size information is decreased significantly below a predetermined second threshold value in comparison with the value of the immediately preceding block size information stored in the storage section (26), the maximum output power state determining section (27) stops transmission of the transmission power increasing request in the transmission power increasing section (23) and transmits, to the mobile communication terminal (11), the transmission power decreasing request for decreasing transmission power of the mobile communication terminal (11) by a predetermined quantity.

In order to achieve the above-described object, according to an eighteenth aspect of the present invention, there is provided a transmission power control apparatus of a mobile communication terminal, in a communication approach for controlling total power of transmission power of each of a plurality of physical channels (9) output from the mobile communication terminal (11) which exchanges information on the plurality of physical channels (9) with a base station using a code division multiple access by adjusting a block size of data that can be transmitted by means of predetermined specific physical channels so as not to exceed a predetermined maximum output power, for setting an output state of transmission power from the mobile communication terminal (11) at the predetermined maximum output power by means of a testing instrument (12) connected to the mobile communication terminal in place of the base station, the apparatus comprising:

a use channel setting section (20) which transmits and sets, from the testing instrument (17) to the mobile communication terminal (11), types of the plurality of physical channels to be transmitted from the mobile communication terminal (11) to the testing instrument (12);

a maximum transmission power setting section (21) which transmits and sets, from the testing instrument (17) to the mobile communication terminal (11), transmittable maximum transmission power of a predetermined first physical channel from among the plurality of physical channels transmitted from the mobile communication terminal (11);

a transmission power ratio setting section (22) which transmits and sets, from the testing instrument (17) to the mobile communication terminal (11), a ratio of transmission power between each of physical channels other than the first physical channel from among the plurality of physical channels transmitted from the mobile communication terminal (11);

a communication establishing section (24) which establishes communication between the testing instrument (17) and the mobile communication terminal (11);

an excessively large adjustment state setting section (37) which provides initial setting to an excessively large adjustment state in which adjustment is made with respect to transmission power of the each of the physical channels in a state in which total power of the transmission power has reached the predetermined maximum output power;

a transmission power decreasing section (23*a*) which continuously transmits, from the testing instrument (17) to the mobile communication terminal (11) at predetermined intervals, a transmission power decreasing request for decreasing transmission power of the mobile communication terminal (11) by a predetermined quantity from the excessively large adjustment state;

a block size extracting section (25) which receives the plurality of physical channels from the mobile communication terminal (11) relative to each transmission of the transmission power decreasing request at the predetermined intervals of the transmission power decreasing section (23*a*), and extracts, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage section (26) which stores, at least one time, the block size information extracted in the block size extracting section (25);

a maximum output power state determining section (27a) which judges whether or not a value of newly extracted block size information in the block size extracting section (25) exceeds a preset value, and in the case where the value of the newly extracted block size information exceeds the preset value, compares the value of the newly extracted block size information with a value of immediately preceding block size information stored in the storage section (26), and in the case where the value of the newly extracted block size information is equal to the value of the immediately preceding block size information stored in the storage section (26), stops transmission of the transmission power decreasing request in the transmission power decreasing section (23a) and transmits, to the mobile communication terminal (11), a transmission power increasing request for increasing transmission power of the mobile communication terminal (11) by a predetermined quantity.

In order to achieve the above-described object, according to a nineteenth aspect of the present invention, there is provided the transmission power control apparatus of a mobile communication terminal according to the eighteenth aspect, wherein the block size extracting section (25b) comprises:

a receiving section (51a) which receives a plurality of times a plurality of physical channels including the second physical channel in transmission intervals of each of transmission power decreasing requests that are continuously transmitted at the predetermined intervals;

a preliminary extracting section (51b) which extracts the block size information respectively from the second physical channel included in the plurality of physical channels received a plurality of times in the receiving section (51a), the extracted block size information each having any of predetermined two values, a smaller value being defined as a first reference value among the predetermined two values, the other value being defined as a second reference value;

a ratio calculating section (51c) which calculates a ratio between a total number of the block size information extracted in the preliminary extracting section (51b) and the number of block size information that is a value equal to the second reference value; and a determining section (51d) which, when the ratio calculated in the ratio calculating section (51c) is greater than a predetermined first threshold value, determines the second reference value as block size information extracted with respect to the transmission power decreasing request, and when the ratio calculated in the ratio calculating section (51c) is equal to or smaller than the first threshold value, determines the first reference value as block size information extracted with respect to the transmission power decreasing request.

In order to achieve the above-described object, according to a twentieth aspect of the present invention, there is provided the transmission power control apparatus of a mobile communication terminal according to the eighteenth aspect, wherein the block size extracting section (25b) comprises:

a receiving section (51a) which receives a plurality of times a plurality of physical channels including the second physical channel in transmission intervals of each of transmission power decreasing requests that are continuously transmitted at the predetermined intervals;

a preliminary extracting section (51b) which extracts the block size information respectively from the second physical channel included in the plurality of physical channels received a plurality of times in the receiving section (51a), defines, as a first reference value, a minimum value of each of the extracted block size information, and defines, as a second reference value, a maximum value of each of the extracted block size information;

a ratio calculating section (51d) which calculates a ratio between a total number of block size information extracted in the preliminary extracting section (51b) and the number of block size information that is a value equal to the second reference value or a value within a predetermined numeric value range relative to the second reference value; and a determining section (51d) which, when the ratio calculated in the ratio calculating section (51d) is greater than a predetermined first threshold value, determines the second reference value as block size information extracted with respect to the transmission power decreasing request, and when the ratio calculated in the ratio calculating section (51d) is equal to or smaller than the first threshold value, determines the first reference value as block size information extracted with respect to the transmission power decreasing request.

In order to achieve the above-described object, according to a twenty-first aspect of the present invention, there is provided the transmission power control apparatus of a mobile communication terminal according to the eighteenth aspect, wherein, in the case where the value of the newly extracted block size information is within a range of the value of the immediately preceding block size information stored in the storage section (26) and a predetermined second threshold value, the maximum output power state determining section (27a) stops transmission of the transmission power decreasing request in the transmission power decreasing section (23a) and transmits, to the mobile communication terminal (11), a transmission power increasing request for increasing transmission power of the mobile communication terminal (11) by a predetermined quantity.

In the transmission power control method of the mobile communication terminal, which is configured as in the first aspect, the transmission power of physical channels, which is output from the mobile communication terminal, is controlled by changing a block size of data to be transmitted in the physical channels.

Here, if the block size is increased, the transmission data volume per unit time increases, and the transmission power of the physical channels must be increased.

The block size of a first physical channel having set the maximum transmission power is always kept track of, by means of the testing instrument.

If an instruction for increasing transmission power is transmitted from the testing instrument to the mobile communication terminal at predetermined time intervals, even if the mobile communication terminal is caused to increase transmission power as well, a predetermined transmission power ratio by means of the channels is maintained. Thus, in a state in which the predetermined transmission power ratio is maintained, the transmission power of the mobile communication terminal having totalized the transmission power of the physical channels also increases.

Then, after the transmission power of the mobile communication terminal has reached the predetermined maximum output power as well, if the instruction for increasing transmission power is continuously issued, the transmission power of the first physical channel having set the maximum transmission power lowers, whereby the total transmission power is maintained at a value that is substantially equal to the maximum output power. Here, the equal value may have a certain margin. In other words, an "excessive adjustment state" shown in FIG. 9 is established.

Therefore, by detecting a timing of lowering transmission power of the first physical channel, it is possible to detect that transmission power of the mobile communication terminal, in a condition in which a given transmission power ratio predetermined by means of the physical channels is maintained, is in the maximum output power state.

Specifically, it is detected that the block size of data on the first physical channel decreases.

In the transmission power control method of the mobile communication terminal, which is configured as in the second aspect, a plurality of block size information are extracted in a duration from delivery of one transmission power increasing request from the testing instrument to the mobile communication terminal to delivery of a next transmission power increasing request. From the plurality of block size information, the block size information corresponding to one transmission power increasing request is determined. Thus, for example, it is prevented to detect the maximum output power state, based on incorrect block size information, which is exerted by factors such as a data error caused by noises and a transient state of the mobile communication terminal.

In the transmission power control method of the mobile communication terminal, which is configured as in the third aspect, even if small fluctuation caused by the mobile communication terminal has occurred with the extracted block size information, the block size information can be stably extracted, and thus, it is possible to detect that the maximum output state is established.

In the transmission power control method configured as in the fourth aspect, it is prevented to incorrectly detect that the maximum output power state is established.

In the transmission power control method of the mobile communication terminal, which is configured as in the fifth aspect, a difference from the first aspect is that the testing instrument first sets transmission power so that the "excessive adjustment state" mentioned previously is established with respect to the mobile communication terminal.

In this state, the transmission power of the first physical channel is substantially lower than the preset maximum transmission power.

From this initial state, if the testing instrument transmits an instruction for lowering transmission power at predetermined time intervals to the mobile communication terminal, the transmission power of physical channels other that that of the first physical channel decreases. However, the total transmission power is maintained at the maximum output power state, so that the transmission power of the first physical channel increases.

Therefore, by detecting a timing at which an increase in transmission power of the first physical channel has stopped, it is possible to detect that the transmission power of the mobile communication terminal, in a condition in which a given transmission power ratio predetermined by means of channels is maintained, is in the maximum output power state.

Specifically, it is detected that an increase in block size of data on the first physical channel has stopped.

Therefore, according to the fifth aspect, it is possible to attain functions and advantageous effects substantially similar to those of the first aspect described above.

In the transmission power control method of the mobile communication terminal, which is configured as in the sixth aspect, it is possible to attain functions and advantageous effects substantially similar to those of the second aspect described previously.

In the transmission power control method configured as in the seventh aspect, it is possible to attain functions and advantageous effects substantially similar to those of the third aspect described previously.

In the transmission power control method configured as in the eighth aspect, it is possible to attain functions and advantageous effects substantially similar to those of the fourth aspect described previously.

In the transmission power control method configured as in the ninth aspect, the communication approach is W-CDMA.

In the transmission power control method configured as in the tenth aspect, a plurality of physical channels output from the mobile communication terminal include at least DPCCH, E-DPCCH, and E-DPDCH.

In the transmission power control method configured as in the eleventh aspect, a first physical channel is E-DPDCH and a second physical channel is E-DPCCH.

In the transmission power control method configured as in the twelfth aspect, block size information is E-TFCI (transfer volume information) included in E-DPCCH.

In the transmission power control method configured as in the thirteenth aspect, a transmission power increasing request and a transmission power decreasing request are instructed at TPC bits included in DPCCH of downlink or F-DPCH of downlink, to be transmitted from the testing instrument to the mobile communication terminal.

In the transmission power control apparatus configured as in the fourteenth aspect, it is possible to attain functions and advantageous effects similar to those of the transmission power control method of the first aspect described previously, of increasing transmission power relative to the mobile communication terminal in a predetermined volume.

In the transmission power control apparatus configured as in the fifteenth aspect, it is possible to attain functions and advantageous effects similar to those of the transmission power control method of the second aspect described previously.

In the transmission power control apparatus configured as in the sixteenth aspect, it is possible to attain functions and advantageous effects similar to those of the transmission power control method of the third aspect described previously.

In the transmission power control apparatus configured as in the seventeenth aspect, it is possible to attain functions and advantageous effects similar to those of the transmission power control method of the fourth aspect described previously.

In the transmission power control apparatus configured as in the eighteenth aspect, it is possible to attain functions and advantageous effects similar to those of the transmission power control method of the fifth aspect described previously, of decreasing transmission power relative to the mobile communication terminal in a predetermined volume.

In the transmission power control apparatus configured as in the nineteenth aspect, it is possible to attain functions and advantageous effects similar to those of the transmission power control method of the second aspect described previously.

In the transmission power control apparatus configured as in the twentieth aspect, it is possible to attain functions and advantageous effects similar to those of the transmission power control method of the third aspect described previously.

In the transmission power control apparatus configured as in the twenty-first aspect, it is possible to attain functions and advantageous effects similar to those of the transmission power control method of the fourth aspect described previously.

As described above, in the present invention, from the testing instrument to the mobile communication terminal to be tested, in the course of increasing or decreasing transmission power of the mobile communication terminal at predetermined intervals by predetermined volume, a specific point of a power volume change in a specific physical channel is detected, whereby, in a state in which a transmission power ratio between physical channels at the mobile communication terminal is specified, the state of the predetermined maximum output power set at this mobile communication terminal can be established within a short period of time and precisely.

BRIEF DESCRIPTION OF THE SEVERAL VIEWS OF THE DRAWING

FIG. 4 is a setting table shown for explaining a relationship among power value, amplitude value, and specified value of physical channels used when transmission powers of five physical channels 9 of the uplink signal output from the mobile communication terminal to which the present invention is applied, are specified with the use of two channels DPDCH and E-AGCH of the downlink signal output from the testing instrument to the mobile communication terminal.

FIG. 5 is a table shown for explaining a relationship between a amplitude ratio and an E-TFCI number, used when anti-DPCCH amplitude ratio ($\beta ed/\beta c$) relative to E-DPDCH is interpolated relative to all E-TFCI numbers (codes) by the mobile communication terminal to which the present invention is applied, the terminal receiving $(Aed)^2=(\beta ed/\beta c)^2$ of the maximum transmission power of E-DPDCH specified at the control channel E-AGCH of the downlink signal.

FIG. 6 is a table shown for explaining a TPC command of DPCCH used when it is specified to increase, decrease, or maintain the transmission power of the uplink signal of the mobile communication terminal with the use of TPC of the control channel DPCCH of the downlink signal output from the testing instrument to the mobile communication terminal, to which the present invention is applied.

FIG. 7 is a view shown for explaining a relationship between an E-TFCI number of E-DPCCH and a block size used when the E-TFCI number capable of specifying a block size corresponding to transmission power of E-DPDCH included in the uplink signal is automatically written at a current time point into a block configuration of E-DPCCH and E-TFCI of the E-DPCCH, included in the uplink signal output from the mobile communication terminal to which the present invention is applied.

FIG. 20 is a block diagram shown for explaining a configuration of essential parts of the transmission power control apparatus which executes the transmission power control method according to the third embodiment, to which the present invention is applied.

FIG. 21 is a block diagram shown for explaining a configuration of essential parts of the transmission power control apparatus which executes the transmission power control method according to the fourth embodiment, to which the present invention is applied.

FIG. 23 is a table shown for explaining factors for changing block size information on E-TFCI of E-DPCCH from the mobile communication terminal to which the present invention is applied.

FIG. 24 is a table shown for explaining factors for changing block size information on E-TFCI of E-DPCCH from the mobile communication terminal to which the present invention is applied.

FIG. 25 is a view shown for explaining a relationship between a mobile communication terminal and a base station, according to a conventional technique.

FIG. 26 is a block diagram shown for explaining a configuration of a CDMA communication approach, according to the conventional technique.

DETAILED DESCRIPTION OF THE INVENTION

Hereinafter, embodiments of the present invention will be described with reference to the accompanying drawings.

Figure 1:
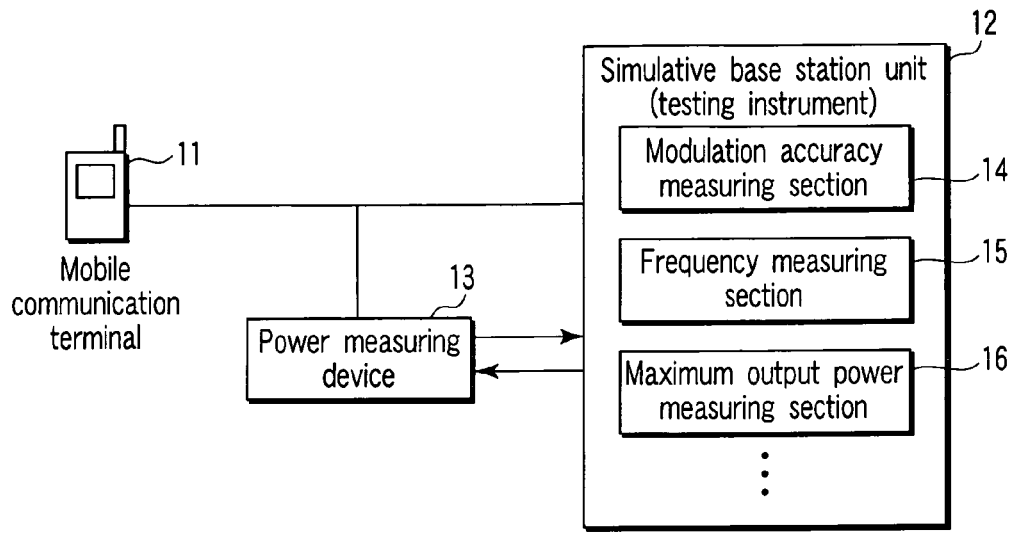
FIG. 1 is a schematic block diagram shown for explaining a testing system relative to a mobile communication terminal to which a transmission power control method and apparatus of the mobile communication terminal, according to the present invention, are applied.

FIG. 1 is a schematic block diagram shown for explaining a testing system relative to a mobile communication terminal 11 to which a transmission power control method and apparatus of the mobile communication terminal, according to the present invention, are applied.

Figure 27:
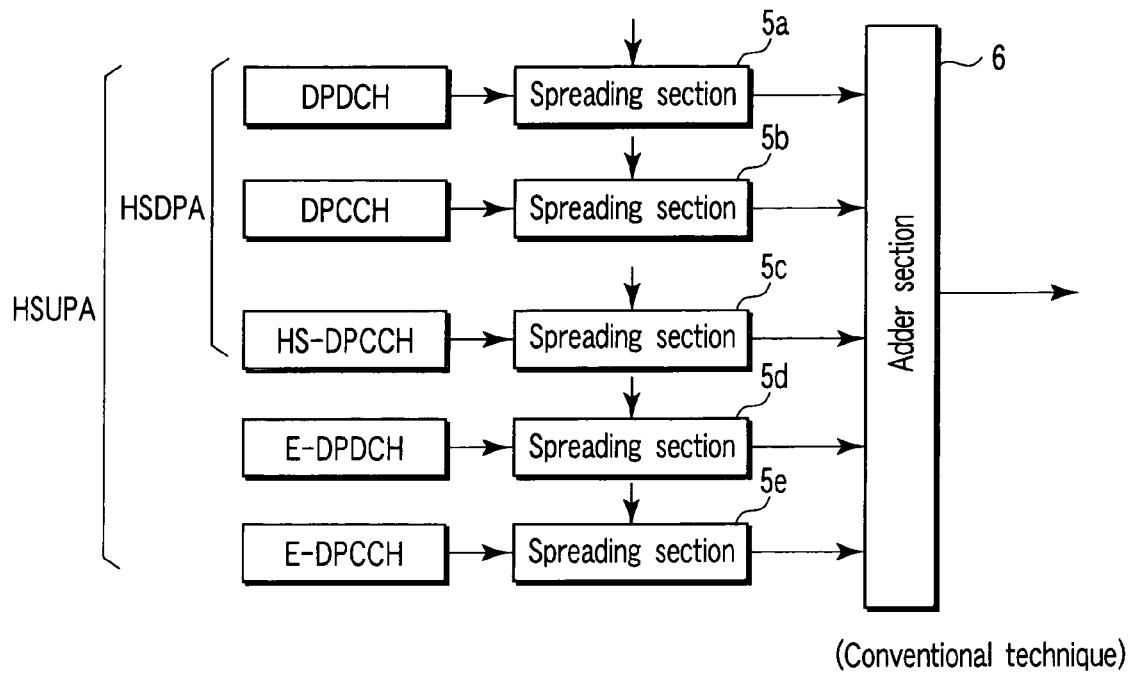
FIG. 27 is a block diagram shown for explaining a configuration of HSDPA and HSUPA communication approaches, according to the conventional technique.
Figure 28:
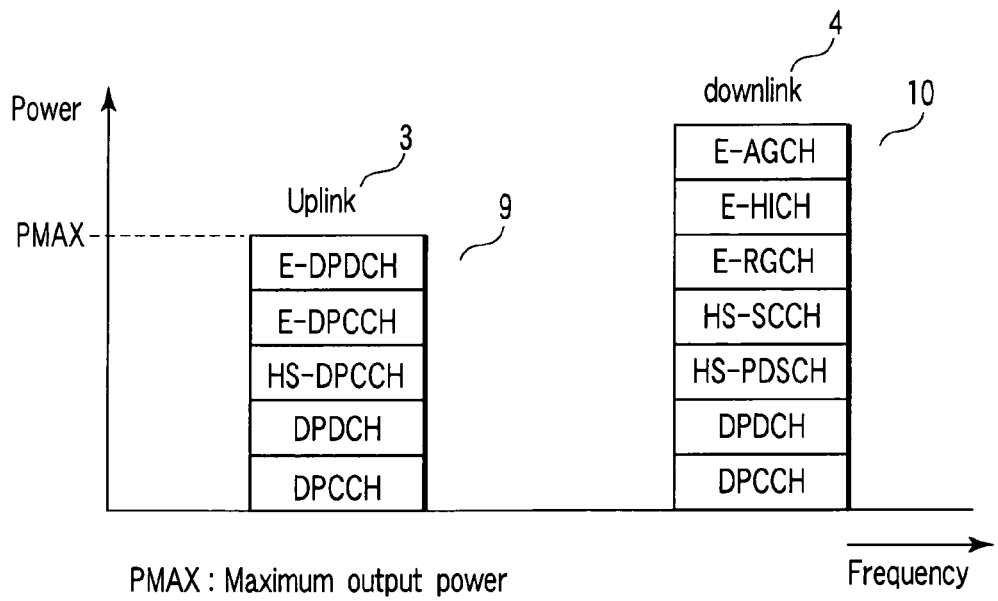
FIG. 28 is a view shown for explaining an output power relationship between an uplink signal and a downlink signal in the HSDPA and HSUPA communication approaches, according to the conventional technique.

In the mobile communication terminal 11 to be tested, the HSDPA and HSUPA communication approaches of FIGS. 27 and 28 are assumed to be employed as is the case with the mobile communication terminal 2 described in FIG. 25.

A simulative base station unit (base station simulator; hereinafter, also referred to as a testing instrument) 12 serving as a testing instrument transmits a variety of test signals to the mobile communication terminal 11 with the use of a downlink signal (downlink), and then, conducts a variety of tests of the mobile communication terminal 11 from a state of the uplink signal (uplink) output from the mobile communication terminal 11.

In addition, the power of the uplink signal (uplink) output from the mobile communication terminal 11 is measured by means of a power measuring device 13, and then, the measurement result is input to the simulative base station unit (testing instrument) 12.

The simulative base station unit (testing instrument) 12 includes, for example, a modulation accuracy measuring section 14, a frequency measuring section 15, and a maximum output power measuring section 16.

A transmission power control apparatus 17 for executing the transmission power control method of the mobile communication terminal, according to the present invention, is incorporated in, and is operated at, the maximum output power measuring section 16 in the simulative base station unit 12 that also serves as a testing instrument.

First Embodiment

Figure 10:
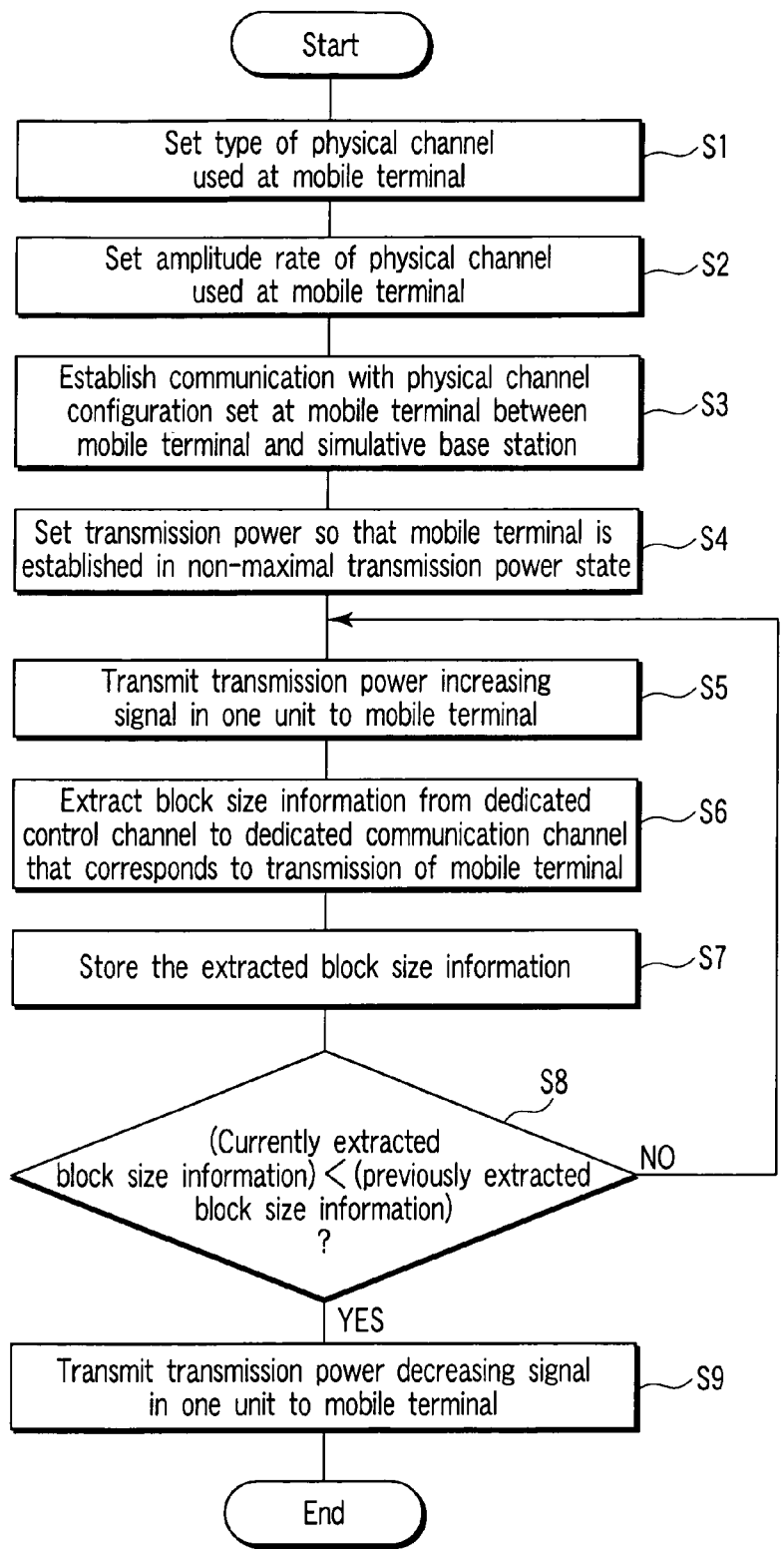
FIG. 10 is a flow chart shown for explaining an entire operation of the transmission power control apparatus according to the first embodiment, to which the present invention is applied.

FIG. 10 is a flow chart shown for explaining an entire operation of a transmission power control apparatus which executes a transmission power control method of a mobile communication terminal, according to a first embodiment, to which the present invention is applied.

Namely, according to a basic configuration of the transmission power control method of the mobile communication terminal according to the first embodiment, there is provided a transmission power control method of a mobile communication terminal, in a communication approach for controlling total power of transmission power of each of a plurality of physical channels 9 output from the mobile communication terminal 11 which exchanges information on the plurality of physical channels 9 with a base station using a code division multiple access by adjusting a block size of data that can be transmitted by means of predetermined specific physical channels so as not to exceed a predetermined maximum output power, for setting an output state of transmission power from the mobile communication terminal 11 at the predetermined maximum output power by means of a testing instrument 12 connected to the mobile communication terminal in place of the base station, the method comprising: a use channel setting step S1 of transmitting and setting, from the testing instrument 12 to the mobile communication terminal 11, types of the plurality of physical channels to be transmitted from the mobile communication terminal 11 to the testing instrument 12; a transmission power ratio setting step S2 of transmitting and setting, from the testing instrument 12 to the mobile communication terminal 11, transmittable maximum transmission power of a predetermined first physical channel from among the plurality of physical channels transmitted from the mobile communication terminal 11, and transmitting and setting, from the testing instrument 12 to the mobile communication terminal 11, a ratio of transmission power between each of physical channels other than the first physical channel from among the plurality of physical channels transmitted from the mobile communication terminal 11; a communication establishing step S3, S4 of establishing communication between the testing instrument 12 and the mobile communication terminal 11 in the testing instrument 12, and transmitting and setting, from the testing instrument 12 to the mobile communication terminal 11, transmission power so as to be a non-maximum transmission power state preset in the mobile communication terminal 11; a transmission power increasing step S5 of continuously transmitting, from the testing instrument 12 to the mobile communication terminal 11 at predetermined intervals, a transmission power increasing request for increasing transmission power of the mobile communication terminal 11 by predetermined quantity; a block size extracting step S6 of receiving, by means of the testing instrument 17, the plurality of physical channels from the mobile communication terminal 11 relative to each transmission of the transmission power increasing request at the predetermined intervals of the transmission power increasing step S5, and extracting, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels; a storage step S7 of storing at least one time, the block size information extracted at the block size extracting step S6 in the testing instrument 12; and a maximum output power state determining step S8, S9 of, in the case where a value of newly extracted block size information in the block size extracting step S6 is decreased below a value of immediately preceding block size information stored in the storage step as a result of comparing the value of the newly extracted block size information with the value of the immediately preceding block size information stored in the storage step S7, stopping transmission of the transmission power increasing request in the transmission power increasing step S5, and transmitting, to the mobile communication terminal 11, a transmission power decreasing request for decreasing transmission power of the mobile communication terminal 11 by a predetermined quantity.

Figure 2:
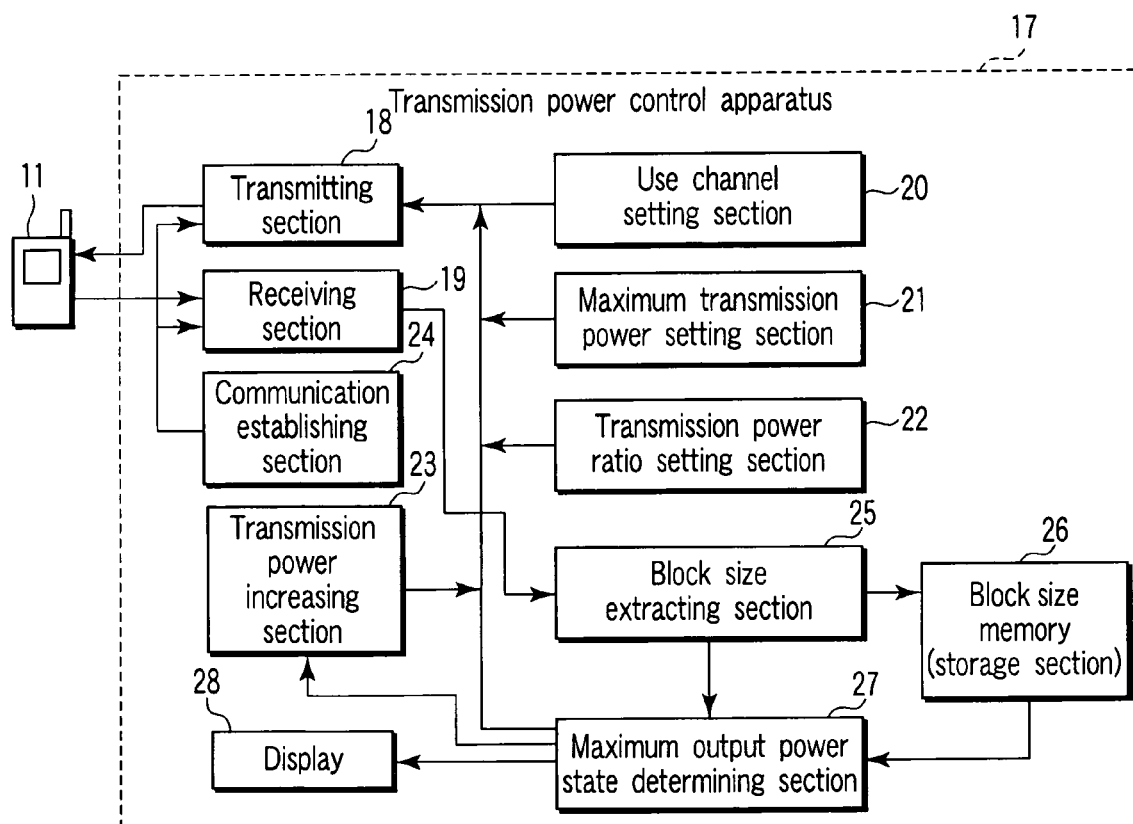
FIG. 2 is a block diagram shown for explaining a general configuration of a transmission power control apparatus to which the transmission power control method and apparatus of the mobile communication terminal, according to a first embodiment of the present invention, are applied.

FIG. 2 is a block diagram shown for explaining a general configuration of a transmission power control apparatus 17 which executes the transmission power control method of the mobile communication terminal, according to the first embodiment of the present invention.

Namely, according to a basic configuration of the transmission power control apparatus of the mobile communication terminal according to the first embodiment, there is provided a transmission power control apparatus of a mobile communication terminal, in a communication approach for controlling total power of transmission power of each of a plurality of physical channels 9 output from the mobile communication terminal 11 which exchanges information on the plurality of physical channels 9 with a base station using a code division multiple access by adjusting a block size of data that can be transmitted by means of predetermined specific physical channels so as not to exceed a predetermined maximum output power, for setting an output state of transmission power from the mobile communication terminal 11 at the predetermined maximum output power by means of a testing instrument 12 connected to the mobile communication terminal in place of the base station, the apparatus comprising: a use channel setting section 20 which transmits and sets, from the testing instrument 12 to the mobile communication terminal 11, types of the plurality of physical channels to be transmitted from the mobile communication terminal 11 to the testing instrument 12; a maximum transmission power setting section 21 which transmits and sets, from the testing instrument 12 to the mobile communication terminal 11, transmittable maximum transmission power of a predetermined first physical channel from among the plurality of physical channels transmitted from the mobile communication terminal 11; a transmission power ratio setting section 22 which transmits and sets, from the testing instrument 12 to the mobile communication terminal 11, a ratio of transmission power between each of physical channels other than the first physical channel from among the plurality of physical channels transmitted from the mobile communication terminal 11; a communication establishing section 24 which establishes communication between the testing instrument 12 and the mobile communication terminal 11, and transmits and sets, from the testing instrument 12 to the mobile communication terminal 11, transmission power so as to be a non-maximum transmission power state preset in the mobile communication terminal 11; a transmission power increasing section 23 which continuously transmits, from the testing instrument 12 to the mobile communication terminal 11 at predetermined intervals, a transmission power increasing request for increasing transmission power of the mobile communication terminal 11 by predetermined quantity from the non-maximum transmission power state; a block size extracting section 25 which receives the plurality of physical channels from the mobile communication terminal 11 relative to each transmission of the transmission power increasing request at the predetermined intervals of the transmission power increasing section 23, and extracts, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels; a storage section 26 which stores, at least one time, the block size information extracted at the block size extracting section 25; and a maximum output power state determining section 27 which, in the case where a value of newly extracted block size information is decreased below a value of immediately preceding block size information stored in the storage section 26 as a result of comparison between the value of the newly extracted block size information in the block size extracting section 25 and the value of the immediately preceding block size information stored in the storage section 26, stops transmission of the transmission power increasing request at the transmission power increasing section 23 and transmits, to the mobile communication terminal 11, a transmission power decreasing request for decreasing transmission power of the mobile communication terminal 11 by a predetermined quantity.

Specifically, this transmission power control apparatus 17, as described previously, is incorporated in the maximum output power measuring section 16 inside the simulative base station unit (testing instrument) 12.

For example, in the transmission power control apparatus 17 made up of an information processing unit such as a computer, there are provided: a transmitting section 18 for transmitting, to the mobile communication terminal 11, a downlink signal (downlink) inclusive of predetermined physical channels 10 shown in FIG. 28; and a receiving section 19 for receiving an uplink signal (uplink) inclusive of five physical channels 9 shown in FIG. 28, the uplink signal being output from the mobile communication terminal 11.

Further, in this transmission power control apparatus 17, there are provided: a use channel setting section 20; a maximum transmission power setting section 21; a transmission power ratio setting section 22; a transmission power increasing section 23; a communication establishing section 24; a block size extracting section 25; a block size memory 26; a maximum output power state determining section 27; and a display 28.

Figure 3:
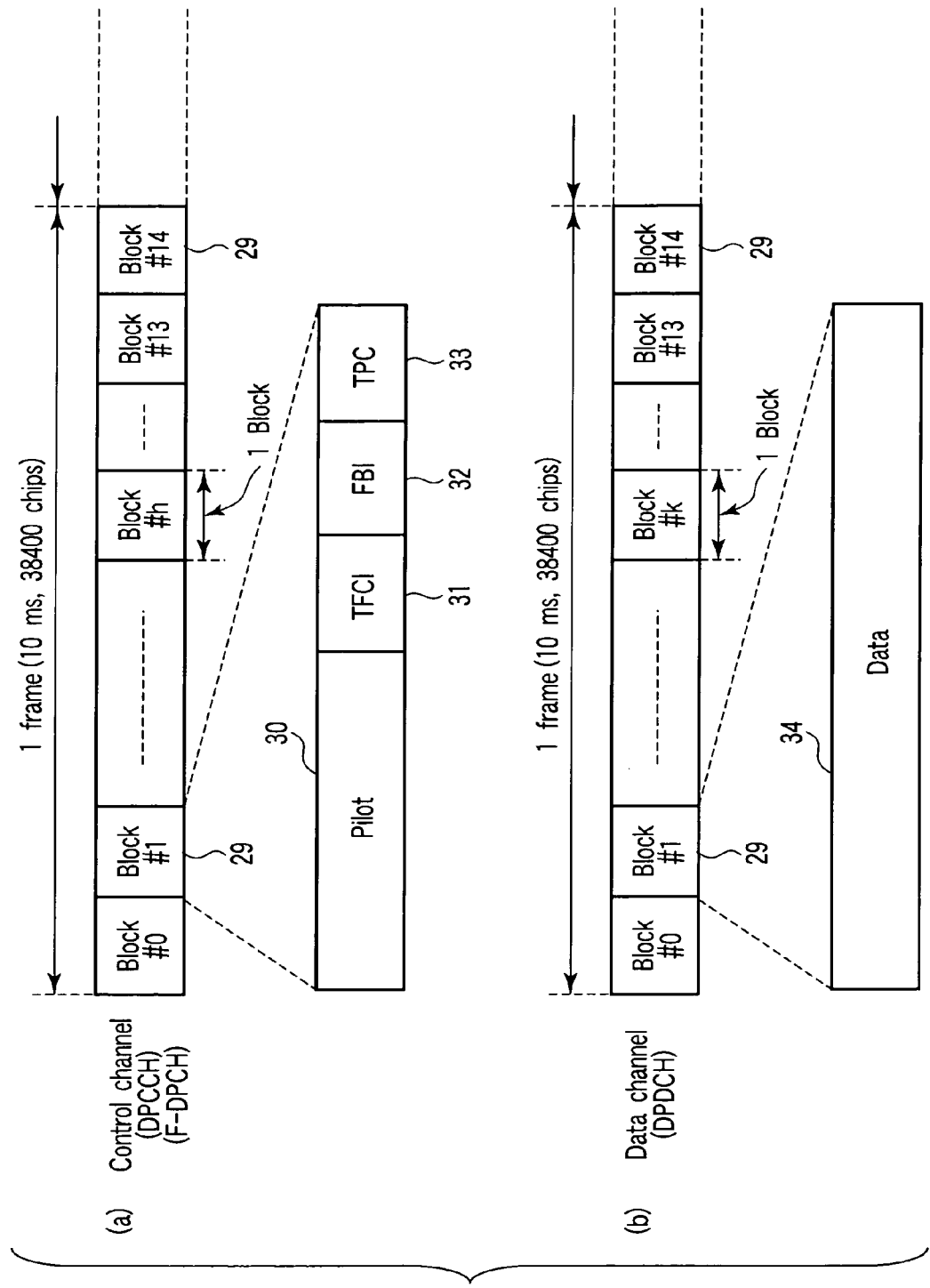
FIG. 3 is a frame configuration view shown for explaining formats of a control channel and a data channel included in a downlink signal in communication between a mobile communication terminal and a simulative base station (testing instrument) to which the present invention is applied.

FIGS. 3A and 3B are frame configuration views shown for explaining formats of control channels and data channels included in the downlink signals in communication between the mobile communication terminal and the simulative base station unit (testing instrument), to which the present invention is applied.

Here, FIG. 3A shows a frame configuration (1-frame 10 ms and 38400 chips) of a control channel DPCCH included in the downlink signals.

In other words, as shown in FIG. 3A, one block (#0 to #14) 29 of the control channel DPCCH is transmitted to, and is received from, one mobile communication terminal 11 at a rate of once per 10 ms, and Pilot 30, TFCI (Transport Format Combination Indicator; transfer volume information) 31, FBI (Feedback Information) 32, and a TPC (Transmit Power Control) 33 are included in DPCCH of one block 29. A detailed description of these items of information will be given later.

In the format of the control channel DPCCH shown in FIG. 3A, a special channel F-DPCH (Fractional-Dedicated Physical Channel) for delivering only a portion of TPC33 is also specified.

In addition, in FIG. 3B, there is shown a frame configuration (one frame 10 ms, 38400 chips) of the data channel DPDCH included in the downlink signal.

In other words, as shown in FIG. 3B, one block (#0 to #14) 29 of the data channel DPDCH is transmitted and received at a rate of once per 10 ms, and data 34 is contained in DPDCH of one block 29.

Next, a configuration and an operation of the use channel setting section 20, the maximum transmission power setting section 21, and the transmission power ratio setting section 22 will be described.

In the transmission power control apparatus 17 according to the embodiment, the transmission powers of the five physical channels 9 of the uplink signal (uplink) output from the mobile communication terminal 11 can be specified with the use of two channels DPDCH and E-AGCH of the downlink signal (downlink) output from the testing instrument 12 to the mobile communication terminal 11.

FIG. 4 is a setting table shown for explaining power value, amplitude value, and specified value of physical channels used when transmission powers of the five physical channels 9 of the uplink signal output from the mobile communication terminal to which the present invention is applied, are specified with the use of two channels DPDCH and E-AGCH of the downlink signal output from the simulative base station unit (testing instrument) 12 to the mobile communication terminal 11.

Specifically, as shown in the setting table of FIG. 4, with respect to DPCCH, the amplitude value βc is obtained as a specified value from the simulative base station unit (testing instrument) 12 as it is, and with respect to DPDCH, the amplitude value βd is obtained as a specified value from the simulative base station unit (testing instrument) 12 as it is.

In addition, as shown in the setting table of FIG. 4, with respect to HS-DPCCH, the state of an amplitude ratio Ahs= (βs/βc) between the amplitude value βhs of the control channel and the amplitude value βc of DPCCH is obtained as a specified value from the simulative base station unit (testing instrument) 12.

In addition, as shown in the setting table of FIG. 4, with respect to E-DPCCH, the state of an amplitude ratio Aec= (βec/βc) between the amplitude value βec of the control channel and the amplitude value βc of DPCCH is obtained as a specified value from the simulative base station unit (testing instrument) 12.

In addition, as shown in the setting table of FIG. 4, with respect to E-DPDCH, the state of a power ratio $(Aed)^2=(\beta ed/\beta c)^2$ indicated by a square of the amplitude ratio (βed/βc) between the amplitude value βed of the data channel and the amplitude value βc of DPCCH is obtained as a specified value from the simulative base station unit (testing instrument) 12.

For example, the amplitude value βc=11/15 is given to DPCCH, and the amplitude value βd=15/15 is given to DPDCH, the amplitude value ratio Ahs=(βhs/βc)=22/15 is given to E-DPCCH, and the amplitude value ratio Aec=(βec/βc)=19/15 is given to E-DPCCH.

Instructive values βc, βd, (βhs/βc), and (βec/βc) other than these E-DPDCH are set as message information in the data channel DPDCH of the downlink signal (downlink) of the testing instrument 12 prior to starting testing.

The mobile communication terminal 11 sets a power ratio of the corresponding physical channels of the uplink signal (uplink), based on the instructive values βc, βd, (βhs/βc), and (βec/βc) set as a message in the data channel DPDCH of the downlink signal (downlink) from the testing instrument 12.

This setting is executed based on a description of "5.1.2.2 Ordinary transmit power control" of 3GPP TS25. 214 of non-patent document 3 serving as the 3GPP standard.

Non-patent document 3: 3GPP TS25. 214 V6.10.0 (2006-09)

Next, power setting of a power ratio $(Aed)^2=(\beta ed/\beta c)^2$ designated by a square of an amplitude ratio between the amplitude value βed of E-DPDCH and the amplitude value βc of DPCCH will be described here.

The maximum power ratio of E-DPDCH employing the power ratio $(Aed)^2=(\beta ed/\beta c)^2$ corresponding to the maximum transmission power that can be permitted for this data channel E-DPDCH is specified.

Then, the mobile communication terminal 11 for receiving the power ratio $(Aed)^2=(\beta ed/\beta c)^2$ of the maximum transmission power of E-DPDCH specified in the control channel E-AGCH of the downlink signal (downlink) interpolates the anti-DPDCCH amplitude ratio (βed/βc) relative to E-DPDCH with respect to all E-TFCI (Enhances-Transport Format Combination Indicator) number (code).

For example, the table 39 shown in FIG. 5 is given from the testing instrument.

FIG. 5 is a table shown for explaining a relationship between a amplitude ratio and an E-TFCI number, used when anti-DPCCH amplitude ratio (βed/βc) relative to E-DPDCH is interpolated relative to all E-TFCI numbers (codes) by the mobile communication terminal to which the present invention is applied, the terminal receiving $(Aed)^2=(\beta ed/\beta c)^2$ of the maximum transmission power of E-DPDCH specified at the control channel E-AGCH of the downlink signal.

This table is employed when interpolation is carried out based on the stipulation of "5.1.2.5 B.2 E-DPDCH/DPCCH) of 3GPP TS25. 214 of non-patent document 3 serving as the 3GPP standard.

By means of this interpolation, the anti-DPCCH amplitude ratio to be used at the time of transmission is interpolated and calculated with respect to all E-TFCIs, i.e., the block sizes.

In this manner, the testing instrument 12 sets the maximum transmission power of the data channel E-DPDCH of the uplink signal (uplink) from the mobile communication terminal 11 with the use of the control channel E-AGCH of the downlink signal (downlink) from the testing instrument 12.

Figure 9:
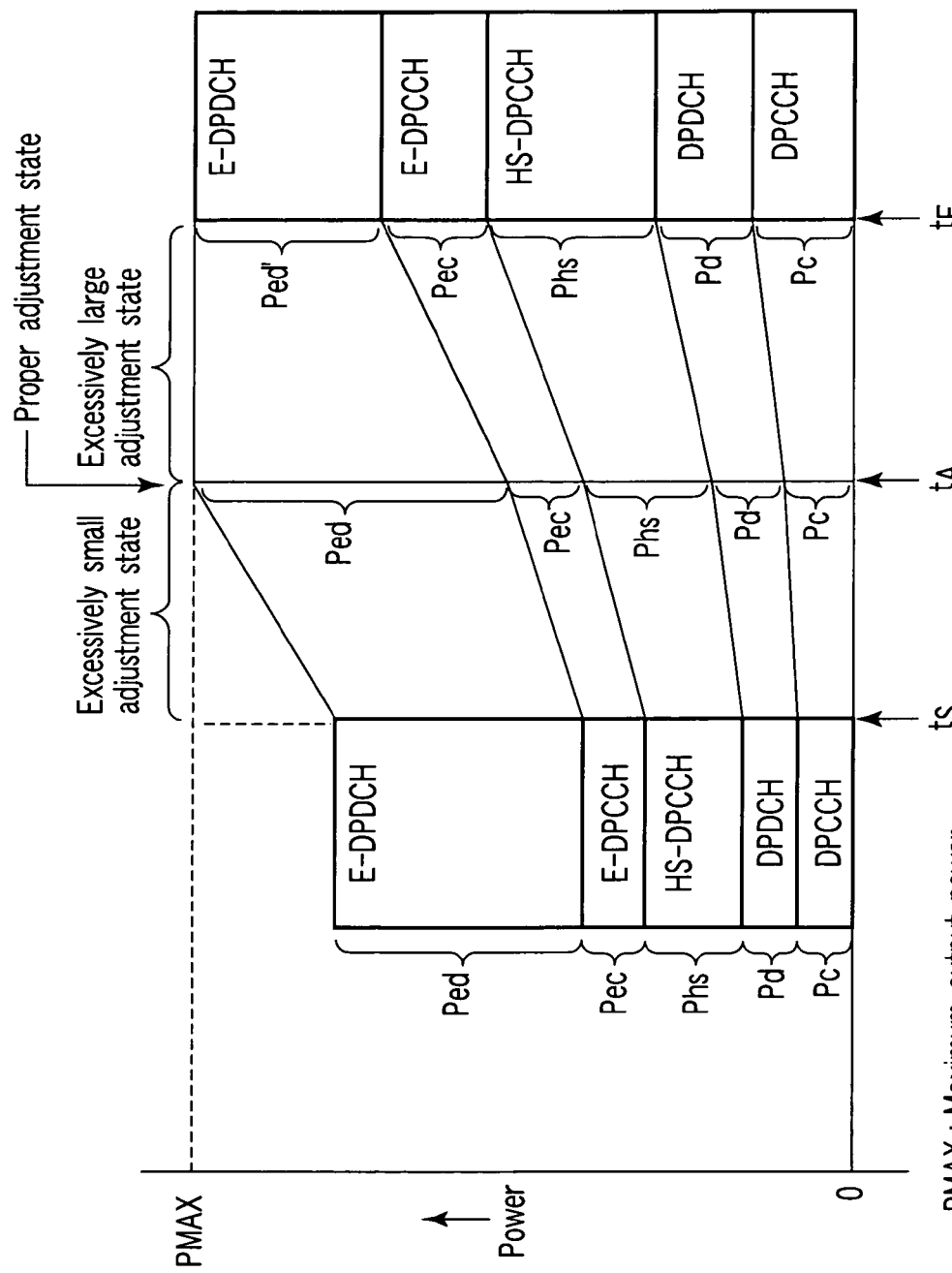
FIG. 9 is a view shown for explaining a change in power values Pc, Pd, Phs, Pec, and Ped of five physical channels (DPCCH, DPDCH, HS-DPCCH, E-DPCCH, and E-DPDCH) included in the uplink signal output from the mobile communication terminal to which the present invention is applied.

The maximum transmission power of E-DPDCH is a power value of E-DPDCH at a time point at which total transmission power of five physical channels has reached the maximum output power PMAX of this mobile communication terminal 11 under a condition that an initial value of the power ratio between DPCCH and the transmission power of the five physical channels configuring the uplink signal is maintained, as shown in the "proper adjustment state" at time $t_A$ of FIG. 9 described later.

For example, in the case where $(\beta ed/\beta c)^2=(119/15)^2$ is defined as a power ratio corresponding to the maximum transmission power, an Index value "20" that is a square of (119/15) of E-AGCH (actual value) is set based on the stipulations of "4.10.1A.1 Table 16B: Mapping of Absolute Grant Value" of 3GPP TS25. 212 of non-patent document 4 serving as the 3GPP standard.

Non-patent document 4: 3GPP TS25. 212 V6.9.0 (2006-09)

Figure 8:
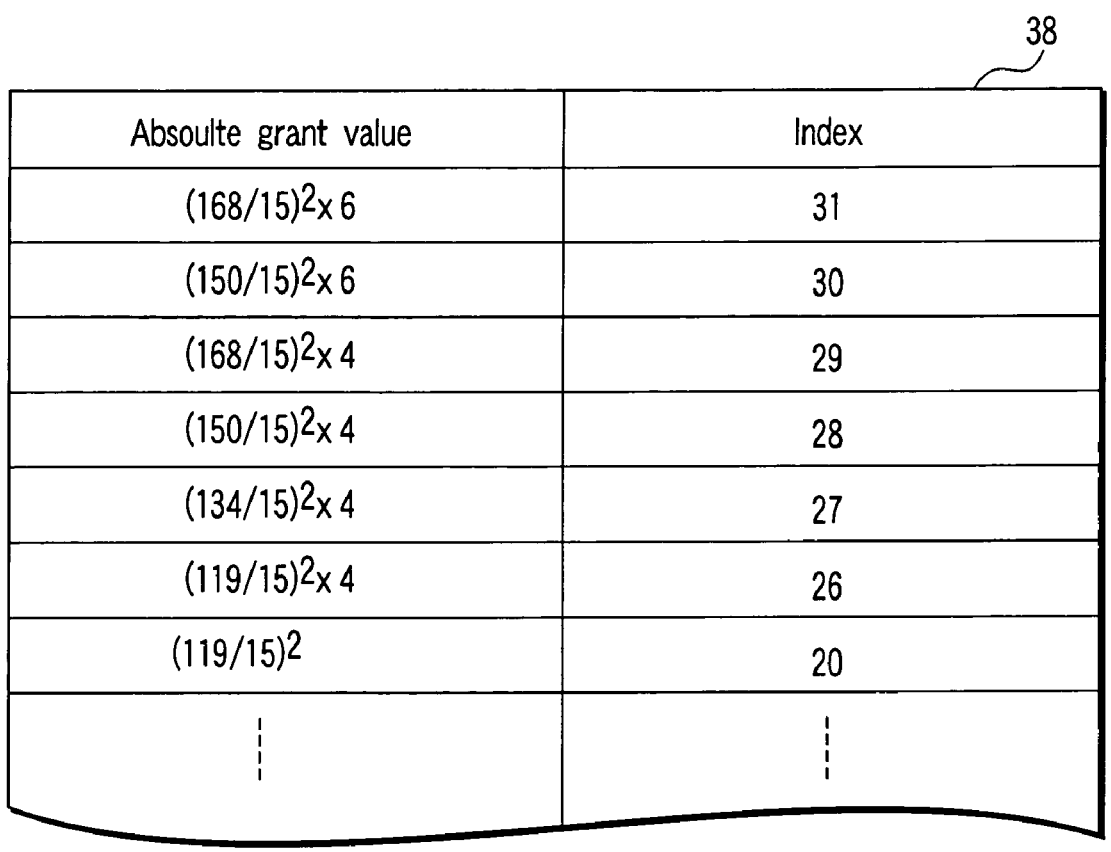
FIG. 8 is a table shown for explaining a relationship between an index and a amplitude value used when the testing instrument to which the present invention is applied is operable to set the maximum transmission power of the data channel E-DPDCH of the uplink signal, with the use of the control channel E-AGCH of the downlink signal.

FIG. 8 shows a table 38 for specifying a relationship between each of the target power ratios (absolute permissible value) and Index.

In other words, FIG. 8 shows a table 38 for specifying a relationship between an index employed when the testing instrument to which the present invention is applied sets the maximum transmission power of the data channel E-DPDCH of the uplink signal with the use of the control channel E-AGCH of the downlink signal and each of the target power ratios (absolute permissible value).

In this manner, the maximum transmission power of powers Pc, Pd, Phs, Pec, Ped, and E-DPDCH of the physical channels 9 at time $t_S$ that is a "excessively small adjustment state" of FIG. 9 prior to starting this power setting process is set from the testing instrument 12 to the mobile communication terminal 11.

Next, an operation of a transmission power increasing section 23 in FIG. 2 will be described.

The testing instrument 12 can specify increasing, decreasing, or maintaining of the transmission power of the uplink signal (uplink) from the mobile communication terminal 11 by means of the transmission power increasing section 23 with the use of TPC (Transmit Power Control) 33 of the control channel DPCCH of the downlink signal (downlink) output from the testing instrument 12 to the mobile communication terminal 11.

FIG. 6 is a table shown for explaining a TPC command of DPCCH used when it is specified to increase, decrease, or maintain the transmission power of the uplink signal of the mobile communication terminal 11 with the use of TPC of the control channel DPCCH of the downlink signal output from the testing instrument 12 to the mobile communication terminal 11, to which the present invention is applied.

In other words, as shown in FIG. 6, the TPC 33 has a logic (algorithm) mode 1 and a logic (algorithm) mode 2.

The logic (algorithm) mode 2 is employed in the transmission power control apparatus 17 according to the present embodiment.

After the mode 2 has been selected by means of the testing instrument 12, when a "11111" command is specified by means of the transmission power increasing section 23, the mobile communication terminal 11 increases the transmission power of the control channel DPCCH of the uplink signal by one unit in comparison with a state of the previous command reception.

After the mode 2 has been selected by means of the testing instrument 12, when a "00000" command is specified by means of the transmission power increasing section 23, the mobile communication terminal 11 decreases the transmission power of the control channel DPCCH of the uplink signal by one unit in comparison with a state of the previous command reception. The actual value of one unit is preset.

Further, after the mode 2 has been selected by means of the testing instrument 12, when a command other than "00000" and "11111" is specified by means of the transmission power increasing section 23, the mobile communication terminal 11 maintains (as it is) the transmission power of the control channel DPCCH of the uplink signal to the transmission power of the previous command reception.

As described previously, the physical channels including the control channel DPCCH are subjected to transmission and reception in cycles of 10 ms, and thus, the instructions for increasing, decreasing, or maintaining the transmission power by means of the transmission power increasing section 23 of the testing instrument 12 are given to the mobile communication terminal 11 in cycles of 10 ms.

Then, the mobile communication terminal 11 having received the instructions for increasing, decreasing, or maintaining the transmission power by means of the transmission power increasing section 23 of the testing instrument 12 increases, decreases (or maintains) the power of DPCCH by unit power in accordance with a TPC command at that time point, as designated in the excessively small adjustment state in FIG. 9.

In accordance with increase, decrease (or maintaining) of the power of DPCCH, the powers of other physical channels (DPDCH, HS-DPCCH, E-DPCCH, and E-DPDCH) are adjusted to an amplitude ratio relating to DPCCH due to the initial setting. Here, the power ratio is a square of the amplitude ratio.

E-DPDCH is also adjusted to a predetermined power ratio relative to DPCCH. In other words, powers of all the physical channels increase.

The mobile communication terminal 11 adjusts a power ratio of E-DPDCH so as not to exceed the maximum output power PMAX of the mobile communication terminal 11, as designated in the "excessively large adjustment state" in FIG. 9 in the case where total power of five physical channels configuring the uplink signal (uplink) exceeds the maximum output power PMAX set at the mobile communication terminal 11 as a result of adjustment.

In the case where the maximum output power PMAX of the mobile communication terminal 11 is exceeded even with this adjustment, the mobile communication terminal 11 stops transmission of E-DPDCH, and adjusts a physical channel other than E-DPDCH at the predetermined amplitude ratio relative to DPCCH and to the maximum output power PMAX of the mobile communication terminal 11.

Next, a block size extracting section 25 in FIG. 2 will be described.

FIG. 7A is a view shown for explaining a block configuration of E-DPCCH included in the uplink signal output from the mobile communication terminal 11 to which the present invention is applied.

As shown in FIG. 7A, one block (10 bits) of E-DPCCH includes transfer volume information E-TFCI (7 bits) 35, Happy Bit (1 bit) and RSH (2 bits).

FIG. 7B is an E-TFCI number table 35a shown for explaining a relationship between E-TFCI number and transmission block size of E-DPCCH employed when the E-TFCI number capable of specifying a block size corresponding to the transmission power of E-DPDCH included in the uplink signal at a current time point is automatically written into E-TFCI of E-DPDCCH included in the uplink signal output from the mobile communication terminal 11 to which the present invention is applied.

First, the E-TFCI number (hereinafter, referred to as block size information) capable of specifying a block size corresponding to the transmission power of E-DPDCH included in the uplink signal (uplink) at the current time point is automatically written based on FIG. 7B into E-TFCI35 of E-DPCCH included in the uplink signal (uplink) output from the mobile communication terminal 11.

Here, the E-TFCI number and block size are given in the E-TFCI number table 35a shown in FIG. 7B.

As a result, the testing instrument 12 extracts block size information at a block size extracting section 25 every time it receives block size information corresponding to the transmission power of E-DPDCH included in the uplink signal (uplink) output from the mobile communication terminal 11 in cycles of 10 ms via the receiving section 19, while at the same time writing into a block size memory 26 the latest single block size information received immediately after a TPC command transmission in order to associate with the TPC command.

Next, in the case where a value of newly extracted block size information is decreased below that of previously extracted block size information as a result of comparing values of block size information sequentially extracted at the block size extracting section 25 in response to a cycle of TPC command transmission with a value of previous block size information stored in the block size memory 26, "00000" shown in FIG. 6 is set at a TPC command of DPCCH, and then, is transmitted to the mobile communication terminal 11 via the transmission power increasing section 23 and the transmitting section 18, whereby the transmission power of physical channels output from the mobile communication terminal 11 is decreased by one unit, and the immediately preceding state is restored.

After that, the maximum output power state determining section 27 sets codes other than "11111" and "000000" for the TPC command of DPCCH shown in FIG. 6, and then, transmits the codes to the mobile communication terminal 11 via the transmission power increasing section 23 and the transmitting section 18, thereby stopping a change of the transmission power of physical channels output from the mobile communication terminal 11, and maintaining the transmission power of the physical channels.

The settings of codes for the TPC command of DPCCH may be executed by the transmission power increasing section 23 in accordance with the instruction from the maximum output power state determining section 27.

Then, the maximum output power state determining section 27 causes the display 28 to display the maximum output power state achievement in the "proper adjustment state" of time $t_A$ of FIG. 9.

FIG. 10 is a flow chart shown for explaining an entire operation of the transmission power control apparatus 17 of the first embodiment.

First, the use channel setting section 20 sets types of physical channels to be used at the mobile communication terminal 11 via the transmitting section 18 (step S1).

Next, the maximum transmission power setting section 21 and the transmission power ratio setting section 22 set the amplitude ratio of each of the physical channels to be used and the maximum transmission power ratio of E-DPDCH with the use of DPDCH and E-AGCH with respect to the mobile communication terminal 11 via the transmitting section 18 (step S2).

Next, the communication establishing section 24 establishes communication in a physical channel configuration set at the mobile communication terminal 11 between the mobile communication terminal 11 and the testing instrument 17 via the transmitting section 18 and the receiving section 19 (step S3).

Further, the transmission power of the mobile communication terminal 11 is adjusted (set) so that the mobile communication terminal 11 is established in a transmission power state that is not maximal and that is an "excessively small adjustment state" indicated by time $t_S$ of FIG. 9 by means of the communication establishing section 24 (step S4).

When the above initial setting terminates, the transmission power increasing section 23 transmits a transmission power increase signal in one unit with the use of DPCCH to the mobile communication terminal 11 via the transmitting section 18 (step S5).

Next, the block size extracting section 25 extracts E-DPDCH block size information from E-DPCCH relative to E-DPDCH corresponding to transmission of the mobile communication terminal 11 via the receiving section 19 (step S6).

Next, the block size memory (storage section) 26 stores the thus extracted block size information (step S7).

Next, in the case where a value of the currently extracted block size information is not smaller than that of the previously extracted block size information (step S8-NO) as a result of comparison between the value of block size information currently extracted by means of the block size extracting section 25 and that of the previously extracted block size information, the maximum output power state determining section 27 reverts to step S5 in which a transmission power increasing signal is transmitted in one unit to the mobile communication terminal 11 via the transmission power increasing section 23 and the transmitting section 18.

In addition, in the case where the value of the currently extracted block size information is smaller than that of the previously extracted block size information as a result of the comparison (step S8-YES), the maximum output power state determining section 27 transmits a transmission power decreasing signal in one unit to the mobile communication terminal 11 via the transmission power increasing section 23 and the transmitting section 18 (step S9).

In this way, the entire transmission power of the uplink signal (uplink) output from the mobile communication terminal 11 has reached the maximum output power PMAX state set at this mobile communication terminal 11 in a state in which the transmission power ratio between physical channels has been specified. Thus, the maximum output power measuring section 16 serving as the testing instrument 12 measures actual power output from the mobile communication terminal 11 by means of the power measuring device 13.

Figure 11:
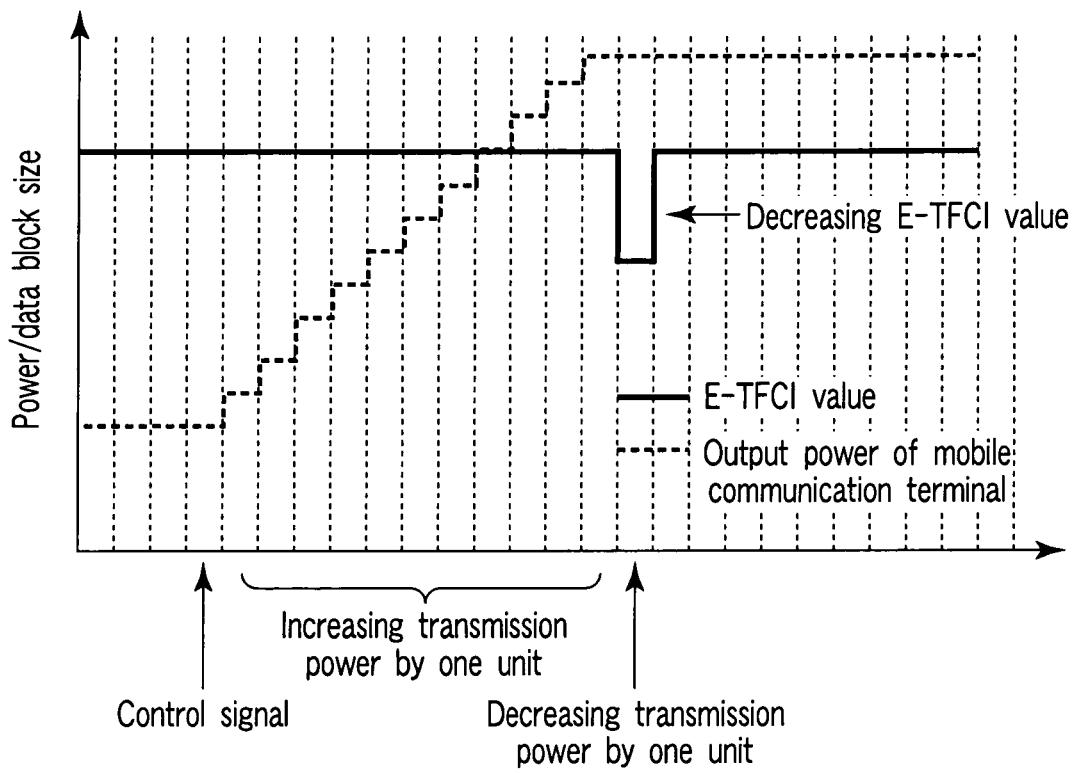
FIG. 11 is a timing chart shown for explaining an entire operation of the transmission power control apparatus according to the first embodiment, to which the present invention is applied.

FIG. 11 is a timing chart shown for explaining an entire operation of the transmission power control apparatus according to the first embodiment, to which the present invention is applied, and a view shown for explaining a relationship between E-TFCI number (value) indicating that power of E-DPDCH is in an excessively large adjustment state and total transmission power of the mobile communication terminal 11.

In other words, in a time interval from a time point at which the transmission power control apparatus 17 stats control to a time point at which total transmission power reaches the maximum output power, the E-TFCI number (value) is constant as indicated by the solid line shown in FIG. 11, and thus, the power of E-DPDCH rises in response to a rise of total transmission power as indicated by the broken line shown in FIG. 11.

Hence, when total transmission power reaches the maximum output power, the E-TFCI number (value) indicating a block size decreases.

By sensing a timing at which this E-TFCI number (value) decreases, i.e., a timing of decreasing the power of E-DPDCH by one unit, a timing at which the power of E-DPDCH includes the maximum output power and a predetermined permissible width and becomes equivalent can be sensed.

FIG. 9 is a view showing a change in power values Pc, Pd, Phs, Pec, and Ped of five physical channels (DPCCH, DPDCH, HS-DPCCH, E-DPCCH, and E-DPDCH) included in the uplink signal (uplink) output from the mobile communication terminal 11 to which the present invention is applied.

In other words, as shown in FIG. 9, in the "excessively small adjustment state" ranging from a time point at which control is started to a time point at which total transmission power reaches the maximum output power, the power values Pc, Pd, Phs, Pec, and Ped rise while the initially set power ratio is maintained.

In addition, as shown in FIG. 9, in the "excessively large adjustment state" in and after the time point ("proper adjustment state") at which the total transmission power reaches the maximum output power, the power values Pc, Pd, Phs and Pec rise while maintaining the initially set power ratio.

In contrast, as shown in FIG. 9, in the "excessively large adjustment state" in and after the "proper adjustment state", only the power value Ped of E-DPDCH is lowered to a power value Ped'.

In other words, this indicates that a state in which a data block of E-DPDCH decreases and power is restricted is established, whereby total transmission power is maintained in the maximum output power PMAX state.

Therefore, in the transmission power control apparatus 17 of the mobile communication terminal according to the first embodiment, from the testing instrument 12 to the mobile communication terminal 11 to be tested, in the course of increasing transmission power of this mobile communication terminal 11 at predetermined intervals by a predetermined quantity, a specific point of a power quantity change of E-DPDCH is detected by the E-TFCI number (value) indicating a size of a data block, whereby, in a state in which a transmission power ratio is specified between physical channels in the mobile communication terminal 11, the state of the maximum output power set at this mobile communication terminal 11 can be established within a short period of time and precisely.

In this case, the specific point of a power quantity change of E-DPDCH is detected by the E-TFCI number (value) indicating a size of a data block, whereby the state of the maximum output power set at this mobile communication terminal 11 can be established within a short period of time and precisely.

Second Embodiment

Figure 13:
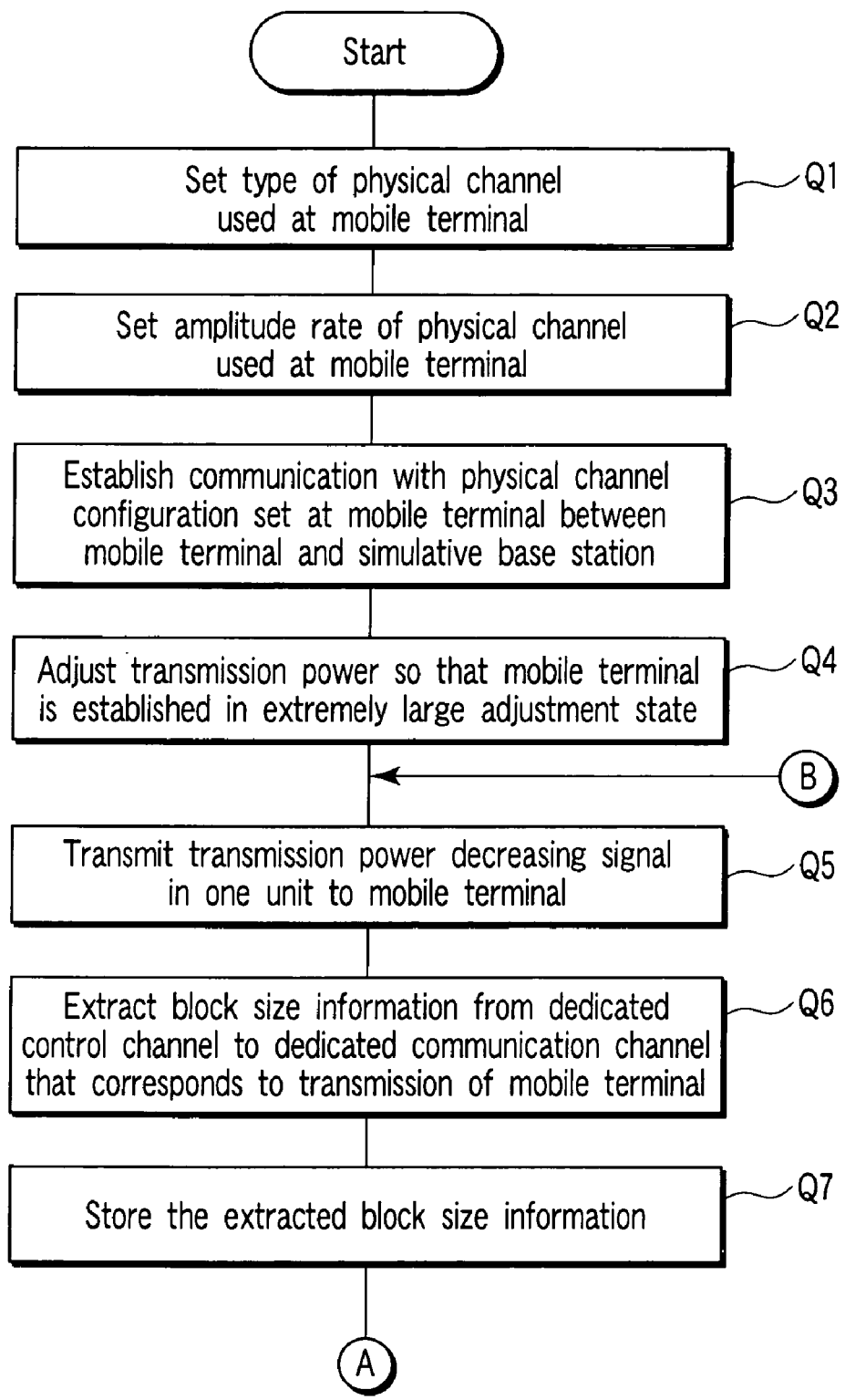
FIG. 13 is a flow chart shown for explaining an entire operation of the transmission power control apparatus according to the second embodiment, to which the present invention is applied.
Figure 14:
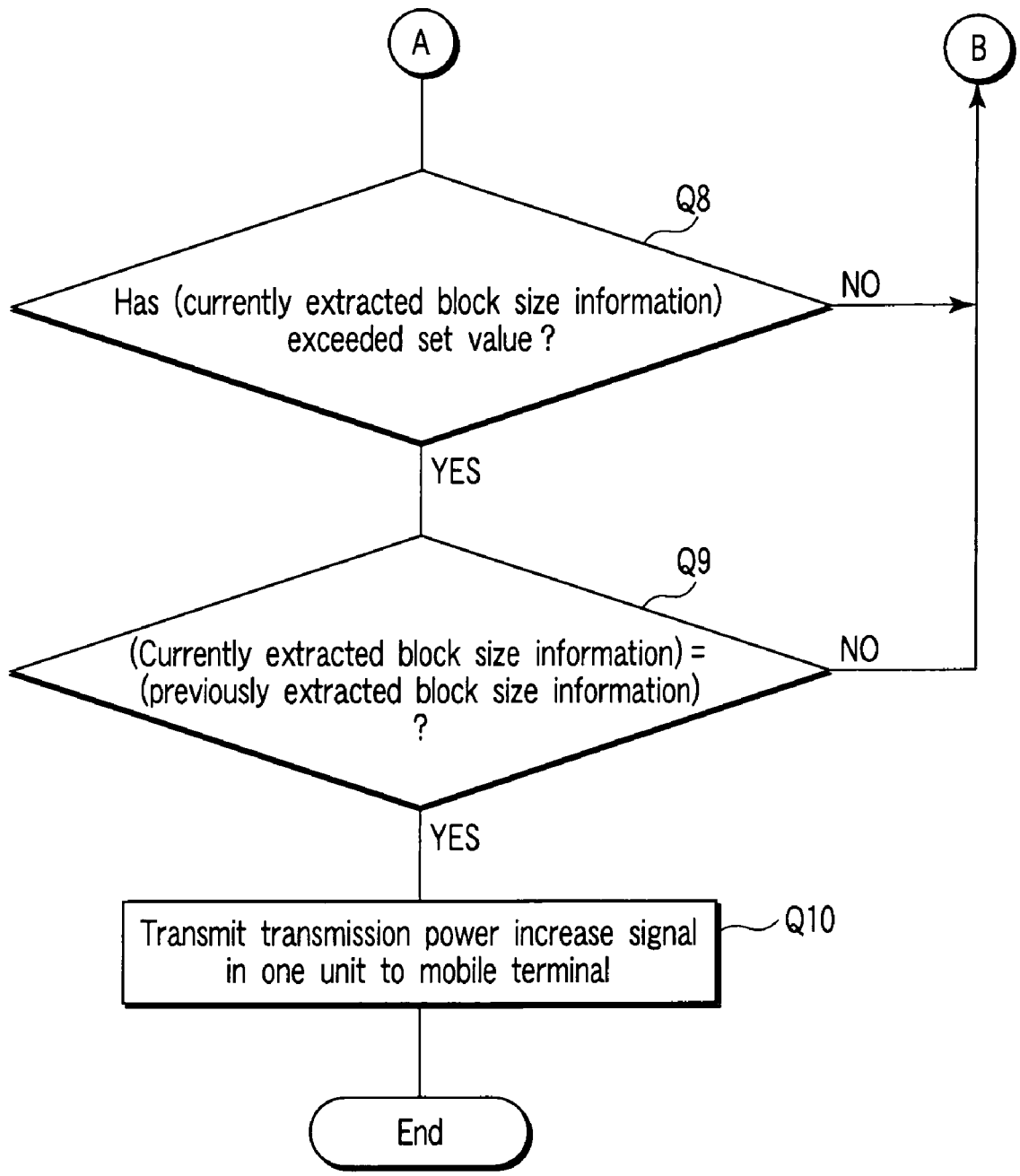
FIG. 14 is a flow chart shown for explaining an entire operation of the transmission power control apparatus according to the second embodiment, to which the present invention is applied.

FIGS. 13 and 14 are flow charts shown for explaining an entire operation of a transmission power control apparatus which executes a transmission power control method of a mobile communication terminal according to a second embodiment, to which the present invention is applied.

Namely, according to a basic configuration of the transmission power control method of the mobile communication terminal according to the second embodiment, there is provided a transmission power control method of a mobile communication terminal, in a communication approach for controlling total power of transmission power of each of a plurality of physical channels 9 output from the mobile communication terminal 11 which exchanges information on the plurality of physical channels 9 with a base station using a code division multiple access by adjusting a block size of data that can be transmitted by means of predetermined specific physical channels so as not to exceed a predetermined maximum output power, for setting an output state of transmission power from the mobile communication terminal 11 at the predetermined maximum output power by means of a testing instrument 12 connected to the mobile communication terminal in place of the base station, the method comprising: a use channel setting step Q1 of transmitting and setting, from the testing instrument 12 to the mobile communication terminal 11, types of the plurality of physical channels to be transmitted from the mobile communication terminal 11 to the testing instrument 12; a maximum transmission power setting step Q2 of transmitting and setting, from the testing instrument 12 to the mobile communication terminal 11, transmittable maximum transmission power of a predetermined first physical channel from among the plurality of physical channels transmitted from the mobile communication terminal 11; a transmission power ratio setting step Q2 of transmitting and setting, from the testing instrument 12 to the mobile communication terminal 11, a ratio of transmission power between each of physical channels other than the first physical channel from among the plurality of physical channels transmitted from the mobile communication terminal 11; a communication establishing step Q3 of establishing communication between the testing instrument 12 and the mobile communication terminal 11 in the testing instrument 12; an excessively large adjustment state setting step Q4 of providing, from the test instrument 12 to the mobile communication terminal 11, initial setting to an excessively large adjustment state in which adjustment is made with respect to transmission power of the each of the physical channels in a state in which total power of the transmission power has reached the predetermined maximum output power; a transmission power decreasing step Q5 of continuously transmitting, from the testing instrument 12 to the mobile communication terminal 11 at predetermined intervals, a transmission power decreasing request for decreasing transmission power of the mobile communication terminal 11 by a predetermined quantity from the excessively large adjustment state; a block size extracting step Q6 of receiving, by means of the testing instrument 12, the plurality of physical channels from the mobile communication terminal 11 relative to each transmission of the transmission power decreasing request at the predetermined intervals of the transmission power decreasing step Q5, and extracting, from a predetermined second physical channel, block size information indicating a block size of transmittable data determined by the maximum output power, the transmittable maximum transmission power set at the first physical channel, and total power of transmission power of the each of the physical channels other than the first physical channel from among the plurality of physical channels; a storage step Q7 of storing, at least one time, the block size information extracted in the block size extracting step Q6 in the testing instrument 12; a block size information judging step Q8 of judging whether or not a value of newly extracted block size information in the block size extracting step Q6 exceeds a preset value in the testing instrument 12; and a maximum output power state determining step Q9, Q10 of, in the case where the value of the newly extracted block size information exceeds the preset value in the block size information judging step Q8, comparing the value of the newly extracted block size information with a value of immediately preceding block size information stored in the storage step Q7, and in the case where the value of the newly extracted block size information is equal to the value of the immediately preceding block size information stored in the storage step Q7, stopping transmission of the transmission power decreasing request in the transmission power decreasing step Q5, and transmitting, to the mobile communication terminal 11, a transmission power increasing request for increasing transmission power of the mobile communication terminal 11 by a predetermined quantity.

Figure 12:
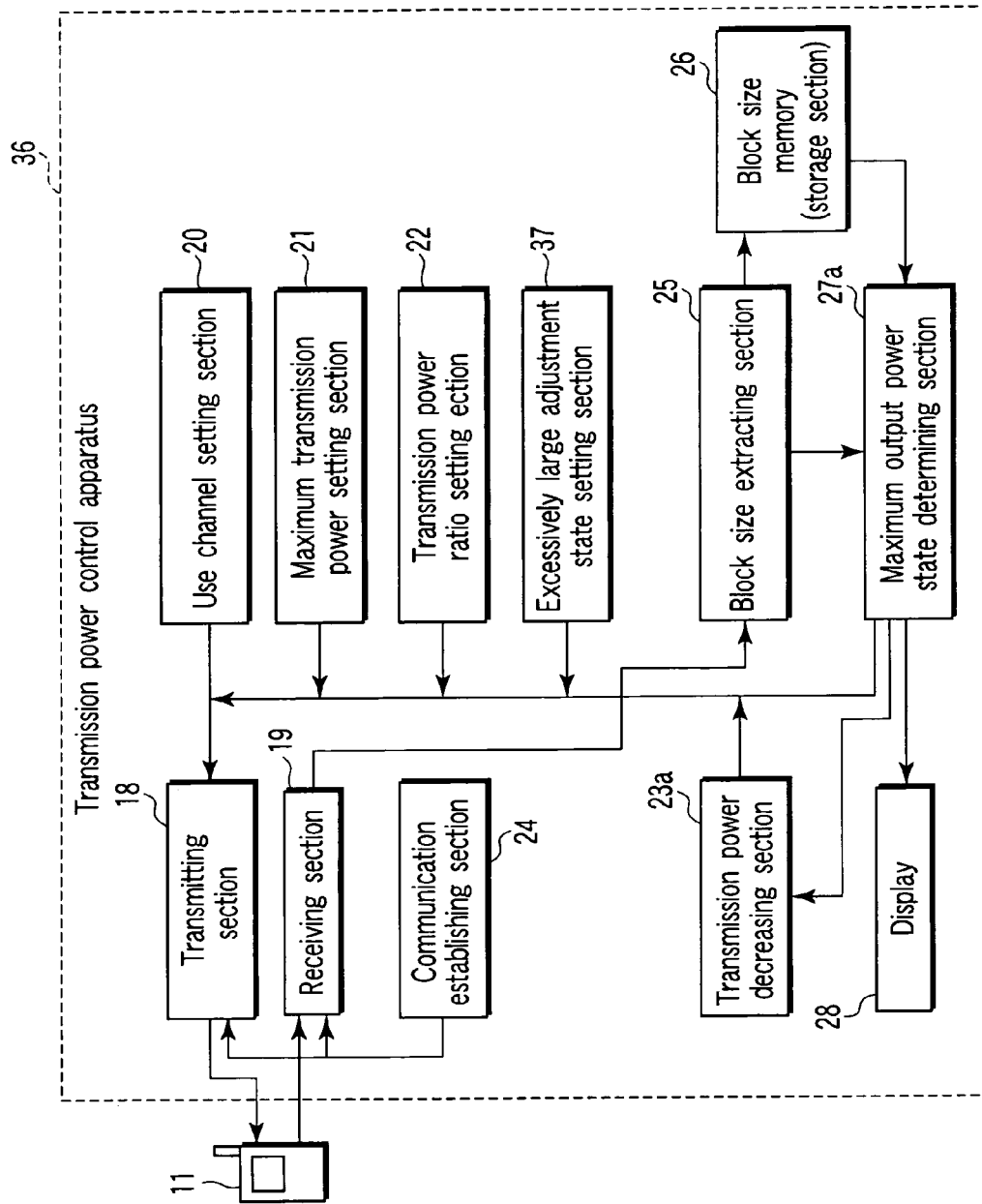
FIG. 12 is a block diagram shown for explaining a general configuration of a transmission power control apparatus for which there is employed a transmission power control method according to a second embodiment, to which the present invention is applied.

FIG. 12 is a block diagram shown for explaining a general configuration of a transmission power control apparatus 36 which executes the transmission power control method of the mobile communication terminal according to the second embodiment, to which the present invention is applied.

In FIG. 12, the same constituent elements as those of the transmission power control apparatus 17 of the mobile communication terminal according to the first embodiment shown in FIG. 2, are designated by the same reference numerals, and a detailed description of duplicate constituent elements is omitted here.

Namely, according to a basic configuration of the transmission power control apparatus of the mobile communication terminal according to the second embodiment, there is provided a transmission power control apparatus of a mobile communication terminal, in a communication approach for controlling total power of transmission power of each of a plurality of physical channels 9 output from the mobile communication terminal 11 which exchanges information on the plurality of physical channels 9 with a base station using a code division multiple access by adjusting a block size of data that can be transmitted by means of predetermined specific physical channels so as not to exceed a predetermined maximum output power, for setting an output state of transmission power from the mobile communication terminal 11 at the predetermined maximum output power by means of a testing instrument 12 connected to the mobile communication terminal in place of the base station, the apparatus comprising: a use channel setting section 20 which transmits and sets, from the testing instrument 17 to the mobile communication terminal 11, types of the plurality of physical channels to be transmitted from the mobile communication terminal 11 to the testing instrument 12; a maximum transmission power setting section 21 which transmits and sets, from the testing instrument 17 to the mobile communication terminal 11, transmittable maximum transmission power of a predetermined first physical channel from among the plurality of physical channels transmitted from the mobile communication terminal 11; a transmission power ratio setting section 22 which transmits and sets, from the testing instrument 17 to the mobile communication terminal 11, a ratio of transmission power between each of physical channels other than the first physical channel from among the plurality of physical channels transmitted from the mobile communication terminal 11; a communication establishing section 24 which establishes communication between the testing instrument 17 and the mobile communication terminal 11; an excessively large adjustment state setting section 37 which provides initial setting to an excessively large adjustment state in which adjustment is made with respect to transmission power of the each of the physical channels in a state in which total power of the transmission power has reached the predetermined maximum output power; a transmission power decreasing section 23a which continuously transmits, from the testing instrument 17 to the mobile communication terminal 11 at predetermined intervals, a transmission power decreasing request for decreasing transmission power of the mobile communication terminal 11 by a predetermined quantity from the excessively large adjustment state; a block size extracting section 25 which receives the plurality of physical channels from the mobile communication terminal 11 relative to each transmission of the transmission power decreasing request at the predetermined intervals of the transmission power decreasing section 23a, and extracts, from a predetermined second physical channel, block size information indicating a block size of transmittable data determined by the maximum output power, the transmittable maximum transmission power set at the first physical channel, and total power of transmission power of the each of the physical channels other than the first physical channel from among the plurality of physical channels; a storage section 26 which stores, at least one time, the block size information extracted in the block size extracting section 25; a maximum output power state determining section 27a which judges whether or not a value of newly extracted block size information in the block size extracting section 25 exceeds a preset value, and in the case where the value of the newly extracted block size information exceeds the preset value, compares the value of the newly extracted block size information with a value of immediately preceding block size information stored in the storage section 26, and in the case where the value of the newly extracted block size information is equal to the value of the immediately preceding block size information stored in the storage section 26, stops transmission of the transmission power decreasing request in the transmission power decreasing section 23a and transmits, to the mobile communication terminal 11, a transmission power increasing request for increasing transmission power of the mobile communication terminal 11 by a predetermined quantity.

Specifically, the transmission power control apparatus 36 according to the second embodiment shown in FIG. 12 is different from the transmission power control apparatus 17 according to the first embodiment shown in FIG. 2 described previously, in that the transmission power decreasing section 23a is employed in place of the transmission power increasing section 23 and the excessively large adjustment state setting section 37 is newly provided.

This excessively large adjustment state setting section 37 initially sets, to the "excessively large adjustment state" in FIG. 9, the power values Pc, Pd, Phs, Pec, and Ped of physical channels (DPCCH, DPDCH, HS-DPCCH, E-DPCCH, and E-DPDCH) of this mobile communication terminal 11 prior to starting transmission power control relative to the mobile communication terminal 11.

Specifically, there is a method for forcibly rising transmission power of the mobile communication terminal 11 by repeatedly specifying a "11111" command shown in FIG. 6 for TPC of the control channel DPCCH of a downlink signal (downlink) output to the mobile communication terminal 11 via the excessively large adjustment state setting section 37 and the transmitting section 18, of the testing instrument 36.

The transmission power decreasing section 23a specifies, at a predetermined cycle, a "00000" command shown in FIG. 6 by means of TPC of the control channel DPCCH of the downlink signal (downlink) output to the mobile communication terminal 11 via the transmitting section 18, and sequentially lowers the transmission power of the mobile communication terminal 11.

The maximum output power state determining section 27a judges whether or not the value of block size information newly extracted corresponding to the cycle of TPC command transmission by means of the block size extraction section 25 via the receiving section 19 has exceeded the preset value. In addition, in the case where the value of the block size information newly extracted has exceeded the preset value, the value of the block size information newly extracted is compared with the value of immediately preceding block size information stored in the block size memory 26. In this manner, when the value of the block size information newly extracted is equal to the value of the immediately preceding block size information extracted, i.e., when a number rise of block size information stops, "11111" shown in FIG. 6 is set at the TPC command of DPCCH via the transmission power decreasing section 23a and the transmitting section 18, and then, the transmission power of physical channels of the mobile communication terminal 11 is increased by one unit, whereby the immediately preceding state is restored.

After that, the maximum output power state determining section 27a sets a code other than "11111" and "00000" shown in FIG. 6 for the TPC command of DPCCH via the transmission power decreasing section 23a and the transmitting section 18, and stops change of the transmission power of physical channels of the mobile communication terminal 11, thereby maintaining the transmission power of physical channels of the mobile communication terminal 11.

Then, the maximum output power state determining section 27a causes the display 28 to display the maximum output power state achievement in the "proper adjustment state" of time $t_A$ of FIG. 9.

Next, an entire operation of the transmission power control apparatus 36 of the mobile communication terminal according to the second embodiment will be described with reference to FIGS. 13 and 14.

First, the use channel setting section 20 sets types of physical channels to be used, at the mobile communication terminal 11 (step Q1).

Next, the maximum transmission power setting section 21 and the transmission power ratio setting section 22 set the amplitude ratio of physical channels to be used and the maximum transmission power ratio of E-DPDCH, with the use of DPDCH and E-AGCH with respect to the mobile communication terminal 11 via the transmitting section 18 (step Q2).

Next, the communication establishing section 24 establishes communication with a physical channel configuration set at the mobile communication terminal 11 between the mobile communication terminal 11 and the testing instrument via the transmitting section 18 and the receiving section 19 (step Q3).

Next, the excessively large adjustment state setting section 37 adjusts transmission power of the mobile communication terminal 11 so that the mobile communication terminal 11 is established in the maximum output state serving as the "excessively large adjustment state" shown at time $t_E$ of FIG. 9 (step Q4).

When the above initial setting terminates, the transmission power decreasing section 23a transmits in one unit a transmission power decrease signal with the use of DPCCH to the mobile communication terminal 11 via the transmitting section 18 (step Q5).

Next, the block size extracting section 25 extracts, as an E-TFCI number (value), E-DPDCH block size information from E-DPCCH to E-DPDCH corresponding to transmission of the mobile communication terminal 11, via the receiving section 19 (step Q6).

Next, the block size memory (storage section) 26 stores the thus extracted block size information (step Q7).

Next, the maximum output power state determining section 27 judges whether or not the value of block size information currently extracted by means of the block size extracting section 25 has exceeded the preset value (step Q8). In addition, in the case where the value of the currently extracted block size information does not exceed the preset value as a result of judgment (step Q8-NO), the current step reverts to step Q5 in which the transmission power decrease signal is transmitted in one unit to the mobile communication terminal 11 via the transmission power decreasing section 23a and the transmitting section 18.

Next, the maximum output power state determining section 27 compares the value of the currently extracted block size information with the previously extracted block size information in the case where the value of the currently extracted block size information has exceeded the preset value as a result of the judgment (step Q9). In the case where the value of the currently extracted block size information is not equal to the value of the preciously extracted block size information as a result of the comparison (step Q9-NO), the current step reverts to step Q5 in which the transmission power decrease signal is transmitted in one unit to the mobile communication terminal 11 via the transmission power decreasing section 23a and the transmitting section 18.

Next, in the case where the value of the currently extracted block size information is equal to the value of the previously extracted block size information as a result of the comparison (step Q9-YES), the maximum output power state determining section 27 stops transmission of the transmission power decreasing request at the transmission power decreasing step (Q5) and transmits a transmission power increase signal in one unit to the mobile communication terminal 11 via the transmission power decreasing section 23a and the transmitting section 18 (step Q10).

Now, in a state in which a transmission power ratio between physical channels has been specified, the entire transmission power of the uplink signal (uplink) output from the mobile communication terminal 11 has reached the maximum output power PMAX state set at this mobile communication terminal 11. Thus, the maximum output power measuring section 16 of FIG. 1 measures actual power output from the mobile communication terminal 11 by means of the power measuring device 13.

Figure 15:
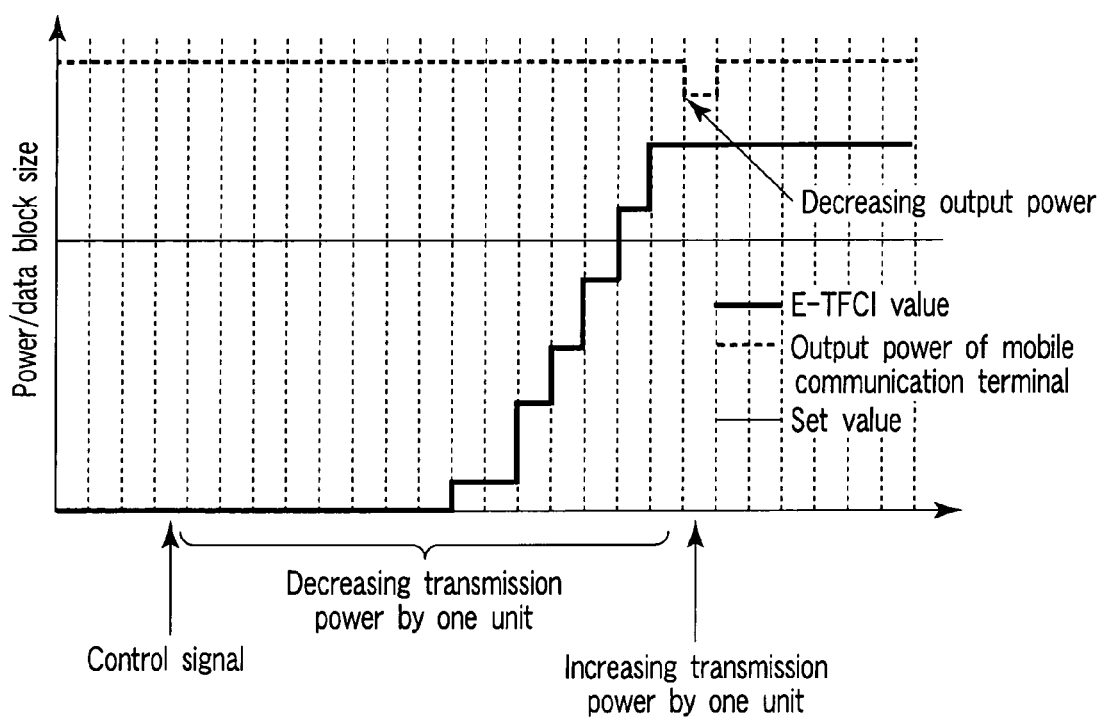
FIG. 15 is a timing chart shown for explaining an entire operation of the transmission power control apparatus according to the second embodiment, to which the present invention is applied.

FIG. 15 is a timing chart shown for explaining an entire operation of the transmission power control apparatus of the mobile communication terminal according to the second embodiment, to which the present invention is applied.

In other words, FIG. 15 shows a relationship between an E-TFCI number (value) indicating that power of E-DPDCH is established in an excessively large adjustment state and total transmission power of the mobile communication terminal 11.

In the present embodiment, at a time point of starting control, the "excessively large adjustment state" in FIG. 9 is established. Thus, total transmission power has already been established in the maximum output power state, as indicated by the dashed line in FIG. 15. Therefore, power of E-DPDCH is much lower than the maximum transmission power set at the E-DPDCH, as indicated by the solid line in FIG. 15.

This indicates that, at this point, the data block size indicated by the E-TFCI number (value) decreases.

Then, if control of an output power decrease is started, the power of physical channels other than E-DPDCH is lowered, and thus, the power of E-DPDCH relatively rises.

Then, the E-TFCI number (value) becomes equal to the previously set value at a time point at which the E-TFCI number (value) obtained when power of E-DPDCH indicates the excessively large adjustment state exceeds the preset value and total transmission power becomes equal to the maximum output power.

A timing at which power of E-DPDCH becomes equivalent to the maximum output power can be detected by detecting a timing at which this E-TFCI number (value) becomes equal to the previously set value, i.e., a timing at which the power of E-DPDCH is increased by one unit.

In the thus configured transmission power control apparatus 36 according to the second embodiment as well, a data block size is detected with the E-TFCI number (value) as a specific point of a power quantity change of E-DPDCH in the course of decreasing transmission power of the mobile communication terminal 11 at predetermined intervals by a predetermined quantity with respect to the mobile communication terminal 11 to be tested, from the testing instrument 12, thereby making it possible to attain functions and advantageous effects similar to those of the transmission power control apparatus 17 according to the first embodiment described previously.

Third Embodiment

Figure 16:
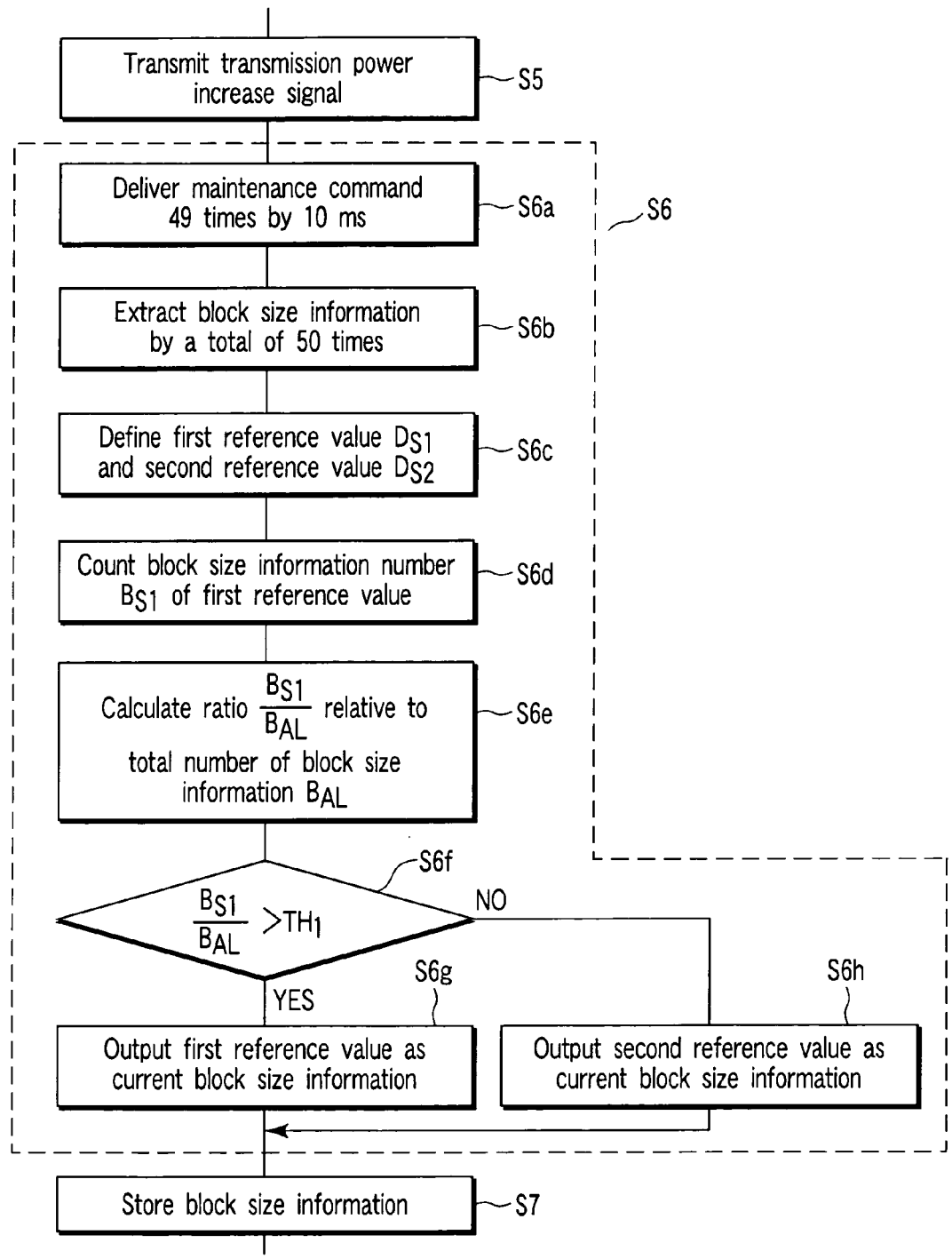
FIG. 16 is a flow chart shown for explaining an operation of essential parts of a transmission power control apparatus for which there is employed a transmission power control method according to a third embodiment, to which the present invention is applied.
Figure 17:
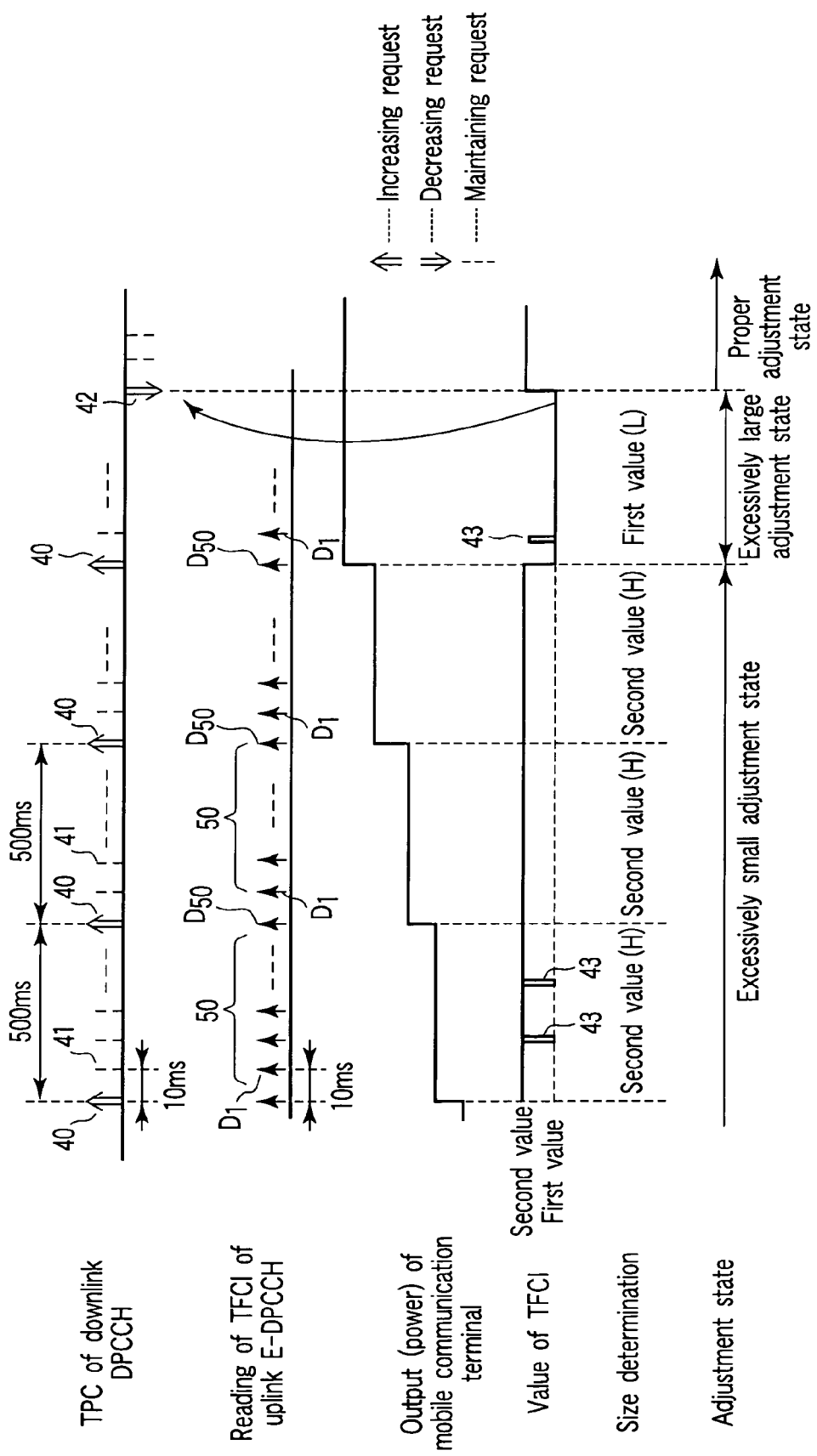
FIG. 17 is a timing chart shown for explaining an operation of the essential parts of the transmission power control apparatus for which there is employed the transmission power control method according to the third embodiment, to which the present invention is applied.

With reference to FIGS. 20, 16, and 17, a description will be given about a transmission power control apparatus which executes a transmission power control method of a mobile communication terminal according to a third embodiment of the present invention.

FIG. 20 is a block diagram shown for explaining a configuration of essential parts (block size extracting section 25a) in the transmission power control apparatus which executes the transmission power control method of the mobile communication terminal according to the third embodiment, to which the present invention is applied.

FIG. 16 is a flow chart shown for explaining an operation of essential parts of the transmission power control apparatus which executes the transmission power control method of the mobile communication terminal according to the third embodiment, to which the present invention is applied.

FIG. 17 is a timing chart shown for explaining an operation of essential parts of the transmission power control apparatus which executes the transmission power control method of the mobile communication terminal according to the third embodiment, to which the present invention is applied.

The transmission power control apparatus of the mobile communication terminal according to the third embodiment has substantially the same configuration as the transmission power control apparatus 17 of the first embodiment shown in FIG. 2, and is different therefrom merely in a transmission power increasing section 23, a block size extracting section 25, and a maximum output power state determining section 27.

Therefore, only constituent elements different from those of the transmission power control apparatus 17 according to the first embodiment will be described hereinafter.

The block size extracting section 25a in the transmission power control apparatus according to the third embodiment is made up of a receiving section 50, a preliminary extracting section 50b, a ratio calculating section 50c, and a determining section 50d, as shown in FIG. 20.

In the transmission power control apparatus 17 of the first embodiment described previously, in step S4 of the flow chart shown in FIG. 10, transmission power of the mobile communication terminal 11 is adjusted so that the mobile communication terminal 11 is established in a transmission power state that is the "excessively small adjustment state" and that is not maximal. After that, a transmission power increase signal is transmitted in cycles of 10 ms with the use of DPCCH to the mobile communication terminal 11, and then, E-DPDCH block size information is extracted from E-DPCCH with respect to one E-DPDCH that corresponds to transmission of the mobile communication terminal, so that the thus extracted block size information is stored as block size information that corresponds to the transmission power increase signal.

In contrast, in the transmission power control apparatus according to the third embodiment, as shown in the timing chart of FIG. 17, a transmission power increasing request 40 is set once in 50 times (500 ms), for example, instead of setting the transmission power increasing request 40 for every DPCCH of the downlink signal transmitted in cycles of 10 ms from the transmission power control apparatus 17 to the mobile communication terminal 11.

Then, a maintaining request 41 is set at DPCCH of 49 downlink signals from one transmission power increasing request 40 to the next transmission power increasing request 40.

Then, the block size extracting section 25a of the transmission power control apparatus according to the third embodiment extracts, as block size information $D_1$-$D_{50}$, E-TFCI in E-DPCCH of 50 uplink signals transmitted from the mobile communication terminal 11 in cycles of 10 ms corresponding to one transmission power increasing request 40 and 49 maintaining requests 41.

Then, the block size extracting section 25a of the transmission power control apparatus according to the third embodiment determines one item of block size information that corresponds to one transmission power increasing request 40, from the extracted 50 items of block size information $D_1$-$D_{50}$, and then, writes the determined information into the block size memory 26.

A processing operation of the block size extracting section 25a for determining one item of block size information that corresponds to one transmission power increasing request 40 from the extracted 50 items of block size information $D_1$-$D_{50}$ is executed in step S6 of the flow chart in FIG. 10.

A detailed processing operation of step S6 in the transmission power control apparatus according to the third embodiment will be described with reference to the flow chart of FIG. 16.

First, following transmission of a transmission power increase signal (request) in step S5, the transmission power increasing section 23a delivers a maintaining signal (request) 49 times by 10 ms to the mobile communication terminal 11 via the transmitting section 18 (step S6a).

Next, when a receiving section 50a receives a plurality of channels that correspond to steps S5 and S6a 50 times, the block size extracting section 25a extracts 50 items of block size information $D_1$-$D_{50}$ (step S6b).

These 50 items of block size information $D_1$-$D_{50}$ take any of digital two values, as shown in FIG. 17, under this condition, and thus, the preliminary extracting section 50b extracts a smaller value as a first reference value $D_{S1}$ and extracts a maximum value as a second reference value $D_{S2}$ (step S6c).

Next, the ratio calculating section 50c counts the number $B_{S1}$ of block size information on the first reference value $D_{S1}$ (step S6d) and calculates a ratio ($B_{S1}/B_{AL}$) of the number $B_{S1}$ of block size information on the first reference value $D_{S1}$ to the number $B_{AL}$ of all block sizes (step S6e).

Next, the determining section 50d determines the first reference value $D_{S1}$ as one item of block size information that corresponds to one transmission power increasing signal (increasing request 40) (step S6g) in the case where the ratio ($B_{S1}/B_{AL}$) is greater than a predetermined first threshold value $TH_1$, and then, writes the determined information into the block size memory 26 (step S7).

On the other hand, in the case where this ratio ($B_{S1}/B_{AL}$) is equal to or smaller than the first threshold value $TH_1$ (S6f-NO), the determining section 50d determines the second reference value $D_{S2}$ as one item of block size information that corresponds to one transmission power increase signal (increasing request 40), and then, writes the determined information into the block size memory 26 (step S7).

Further, in the transmission power control apparatus according to the third embodiment, in step S8 of the flow chart of FIG. 10, in the case where the value of the currently extracted block size information is not decreased significantly below the predetermined threshold value in comparison with the value of the previously extracted block size information (equivalent to step S8-NO), the current step reverts to step S5 in which a transmission power increase signal (increasing request 40 in the timing chart of FIG. 17) is transmitted in one unit to the mobile communication terminal 11.

In addition, in the case where the value of the currently extracted block size information has decreased significantly below the predetermined second threshold value in comparison with the value of the previously extracted block size information (equivalent to step S8-YES), the maximum output power state determining section 27 transmits in one unit a transmission power decrease signal (decreasing request 42 in the timing chart of FIG. 17) to the mobile communication terminal 11 (step S9).

In step S8, in the case where the value of the currently extracted block size information does not decrease significantly below the predetermined second threshold value in comparison with the previously extracted block size information (equivalent to step S8-NO), the value of the previously extracted block size information may be employed for next comparison. In this case, there is also an advantage that the value of block size information targeted for comparison does not change.

In the thus configured transmission power control apparatus of the mobile communication terminal according to the third embodiment as shown in FIG. 17, during 500 ms from a time point at which one transmission power increasing request 40 is delivered to the mobile communication terminal 11, to a time point at which a next transmission power increasing request 40 is delivered, for example, 50 items of block size information $D_1$-$D_{50}$ are extracted, and block size information that corresponds to such one transmission power increasing request 40 is determined from these 50 items of block size information $D_1$-$D_{50}$. Thus, for example, it is prevented to detect the maximum output power state based on incorrect E-TFCI 43 caused by factors such as a data error that has occurred due to noises or the like, for example.

Further, the mobile communication terminal 11 may be established in a transient state from receipt of the transmission power increasing request 40 to determination of a transmission power value (block size). In this case as well, one item of block size information is determined by means of the processing operation described previously from a plurality of received block size information, thus making it possible to improve reliability more remarkably.

The present invention is not limited to the third embodiment. While, in the third embodiment, 50 items of block size information $D_1$-$D_{50}$ have been allowed to take any of digital two values, it may be thought that a value changes in the vicinity of each of the small and large two values, as described later.

Therefore, it is possible to change the processing operations of steps S6c and S6d in the flow chart of FIG. 16 as follows.

First, in step S6c, the preliminary extracting section 50b extracts as a first reference value $D_{S1}$ the minimum value in 50 items of block size information $D_1$-$D_{50}$ and extracts the maximum value as a second reference value $D_{S2}$.

Next, the ratio calculating section 50c counts the number $B_{S1}$ of block size information serving as a value equal to the first reference value $D_{S1}$ and a value within a predetermined numeric value range with respect to the first reference value $D_{S1}$ (step S6d) and calculates a ratio ($B_{S1}$/$B_{AL}$) of the number $B_{S1}$ of block size information of the first reference value $D_{S1}$ to the number $B_{AL}$ of all block size information (step S6e).

With this configuration, even in the case where the block size information $D_1$-$D_{50}$ changes by one point (unit) as described later, the present invention can be sufficiently applied.

In the third embodiment, the receiving section 19 of FIG. 2 may be employed instead of the receiving section 50a in the block size extracting section 25a.

Fourth Embodiment

A transmission power control apparatus which executes a transmission power control method of a mobile communication terminal according to a fourth embodiment of the present invention will be described with reference to FIGS. 21, 18, and 19.

FIG. 21 is a block diagram shown for explaining a configuration of essential parts (block size extracting section 25a) of the transmission power control apparatus which executes the transmission power control method of the mobile communication terminal, according to the fourth embodiment, to which the present invention is applied.

Figure 18:
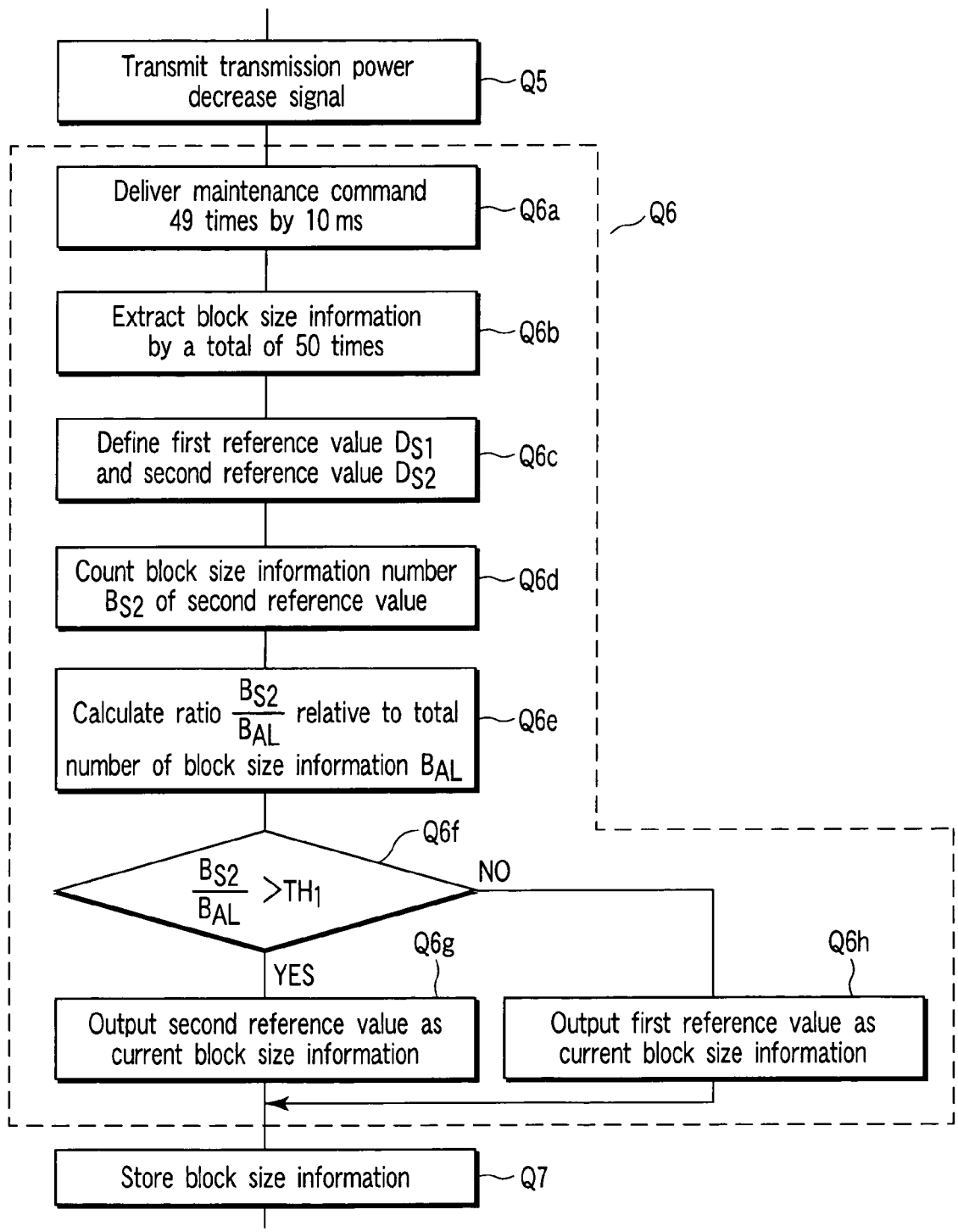
FIG. 18 is a flow chart shown for explaining an operation of essential parts of a transmission power control apparatus which executes a transmission power control method according to a fourth embodiment, to which the present invention is applied.

FIG. 18 is a flow chart shown for explaining an operation of essential parts in the transmission power control apparatus which executes the transmission power control method of the mobile communication terminal according to the fourth embodiment, to which the present invention is applied.

Figure 19:
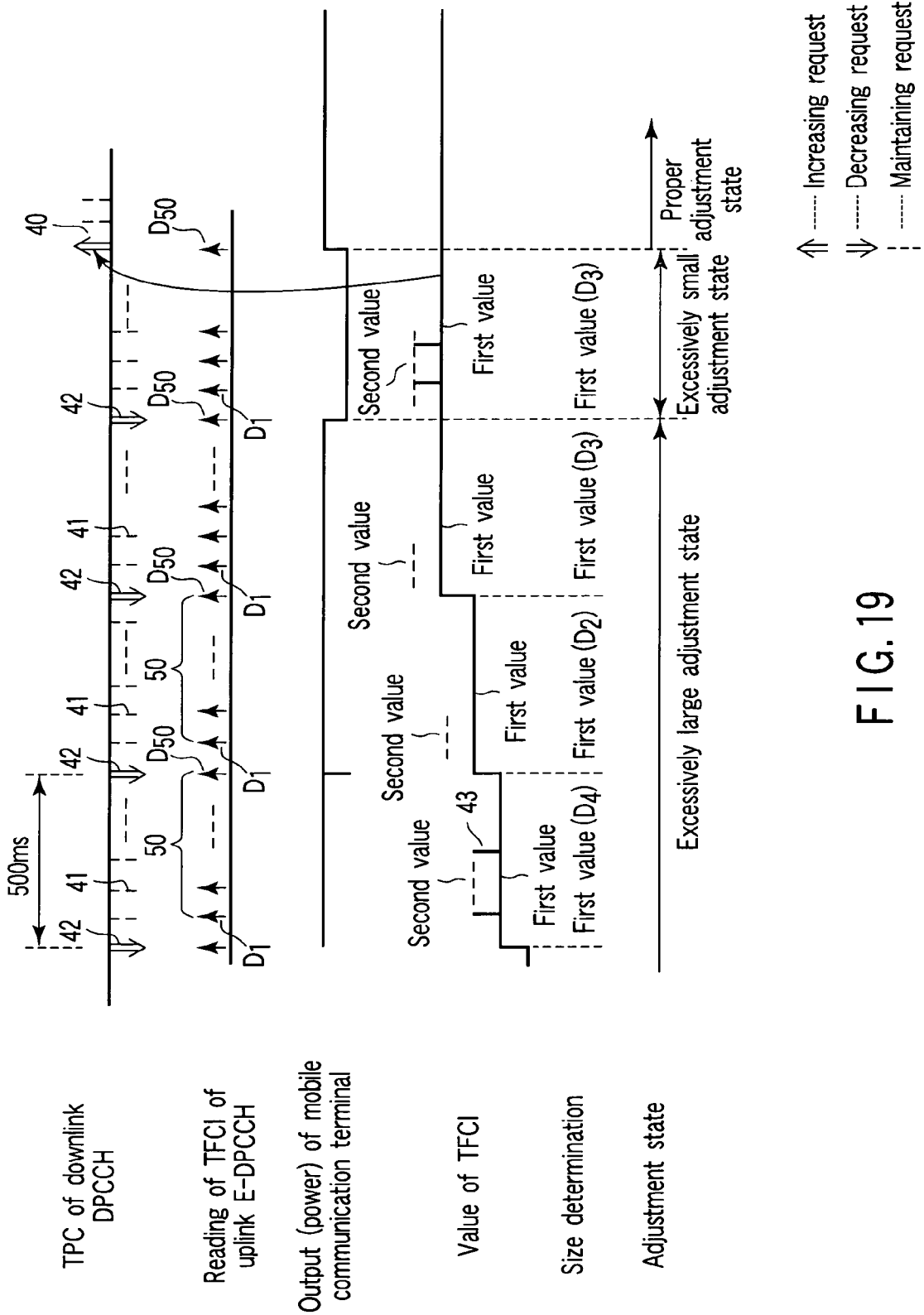
FIG. 19 is a timing chart shown for explaining an entire operation of the transmission power control apparatus according to the fourth embodiment, to which the present invention is applied.

FIG. 19 is a timing chart shown for explaining an operation of essential parts in the transmission power control apparatus which executes the transmission power control method of the mobile communication terminal according to the fourth embodiment, to which the present invention is applied.

The transmission power control apparatus of the mobile communication terminal according to the fourth embodiment has substantially the same configuration as the transmission power control apparatus 36 of the mobile communication terminal according to the second embodiment shown in FIG. 12, and is different therefrom merely in a transmission power decreasing section 23b, a block size extracting section 25b, and a maximum output power state determining section 27b.

Therefore, only constituent elements different from those of the transmission power control apparatus 36 according to the second embodiment will be described hereinafter.

A block size extracting section 25b in the transmission power control apparatus 36 according to the fourth embodiment is made up of a receiving section 51a, a preliminary extracting section 51b, a ratio calculating section 51c, and a determining section 51d, as shown in FIG. 21.

In the transmission power control apparatus 36 according to the second embodiment described previously, in step Q4 of the flow chart shown in FIG. 13, transmission power of the mobile communication terminal 11 is adjusted so that the mobile communication terminal 11 is established in the maximum transmission power state serving as the "excessively large adjustment state". After that, a transmission power decrease signal is transmitted to the mobile communication terminal 11 in cycles of 10 ms with the use of DPCCH of the downlink signal, and E-DPDCH block size information is extracted from E-DPCCH with respect to one E-DPDCH that corresponds to transmission of the mobile communication terminal 11 so that the thus extracted block size information is stored as block size information that corresponds to a transmission power decrease signal.

In contrast, in the transmission power control apparatus 36 according to the fourth embodiment, as shown in the timing chart of FIG. 19, a transmission power decreasing request 42 is set only once in 50 times (500 ms) instead of setting the request at every DPCCH of the downlink signal to be transmitted in cycles of 10 ms from the transmission power control apparatus 36 to the mobile communication terminal 11.

Then, a maintaining request 41 is set at DPCCH of 49 downlink signals from one transmission power decreasing request 42 to a next transmission power decreasing request 42.

Then, the block size extracting section 25b of the transmission power control apparatus 36 according to the fourth embodiment extracts E-DPDCH block size information $D_1$-$D_{50}$ from TFCI in E-DPCCH of 50 uplink signals transmitted from the mobile communication terminal 11 in cycles of 10 ms corresponding to one transmission power decreasing request 42 and 49 maintaining requests 41.

Then, the block size extracting section 25b of the transmission power control apparatus 36 according to the fourth embodiment determines one item of block size information that corresponds to one transmission power increasing request 40, from the extracted 50 items of block size information $D_1$-$D_{50}$, and writes the determined information into the block size memory 26.

The processing operation of the block extracting section 25b for determining one item of block size information that corresponds to one transmission power decreasing request 42 from the thus extracted 50 items of block size information $D_1$-$D_{50}$ is executed in step Q6 in the flowchart of FIG. 13.

A detailed processing operation in step Q6 in the fourth embodiment will be described with reference to the flow chart of FIG. 18.

First, following transmission of a transmission power increase signal (request) in step Q5, the transmission power decreasing section 23a delivers a maintaining signal (request) 49 times by 10 ms to the mobile communication terminal 11 via the transmitting section 18 (step Q6a).

Next, when the receiving section 50a receives a plurality of physical channels that correspond to steps Q5 and Q6a 50 times, the preliminary extracting section 51b extracts 50 items of block size information $D_1$-$D_{50}$ (step Q6b).

These 50 items of block size information $D_1$-$D_{50}$ take any of digital two values, as shown in FIG. 19, until a next transmission power decrease signal (request) is input, and thus, the preliminary extracting section 50b extracts a smaller value as a first reference value $D_{S1}$ and extracts a larger value as a second reference value $D_{S2}$ (step Q6c).

Next, the ratio calculating section 50c counts the number $B_{S2}$ of block size information of the second reference value $D_{S2}$ (step Q6d) and calculates a ratio ($B_{S2}/B_{AL}$) of the number $B_{S2}$ of block size information of the second reference value $D_{S2}$ to the number $B_{AL}$ of all block size information (step Q6e).

Next, the determining section 50d determines the second reference value $D_{S2}$ as one item of block size information that corresponds to one transmission power decrease signal (decreasing request 42) (step S6g) in the case where the ratio ($B_{S2}/B_{AL}$) is greater than a predetermined first threshold value $TH_1$ (step S6f-YES), and then, writes the determined information into the block size memory 26 (step Q7).

On the other hand, in the case where this ratio ($B_{S2}/B_{AL}$) is equal to or smaller than the first threshold value $TH_1$ (S6f-NO), the determining section 50d determines the first reference value $D_{S1}$ as one item of block size information that corresponds to one transmission power decrease signal (decreasing request 42) (step S6h), and then, writes the determined information into the block size memory 26 (step Q7).

Further, in the transmission power control apparatus 36 of the mobile communication terminal according to the fourth embodiment, in step Q8 of the flow chart of FIG. 14, the maximum output power state determining section 27 judges whether or not the value of the block size information currently extracted by means of the block size extracting section 25 has exceeded the preset value. In addition, in the case where the value of the currently extracted block size information does not exceed the preset value as a result of judgment (step Q8-NO), the current step reverts to step Q5 in which a transmission power decrease signal is transmitted in one unit to the mobile communication terminal 11 via the transmission power decreasing section 23a and the transmitting section 18.

Next, the maximum output power state determining section 27 compares the value of the currently extracted block size information with the value of the previously extracted block size information in the case where the value of the currently extracted block size information has exceeded the preset value as a result of the judgment (step Q9). In the case where the value of the currently extracted block size information is not equal to the value of the preciously extracted block size information as a result of comparison (step Q9-NO), the current step reverts to step Q5 in which the transmission power decrease signal (decreasing request 42 in the timing chart of FIG. 19) is transmitted in one unit to the mobile communication terminal 11 via the transmission power decreasing section 23a and the transmitting section 18.

Next, in the case where the value of the currently extracted block size information is equal to the value of the previously extracted block size information as a result of the comparison (step Q9-YES), the maximum output power state determining section 27 stops transmission of the transmission power decreasing request at the transmission power decreasing step (Q5), and transmits a transmission power increase signal (increasing request 40 in the timing chart of FIG. 19) in one unit to the mobile communication terminal 11 via the transmission power decreasing section 23a and the transmitting section 18 (step Q10).

Further, in the transmission power control apparatus 36 of the mobile communication terminal according to the fourth embodiment, in step Q9 in the flow chart of FIG. 14, in the case where a difference between the value of the currently extracted block size information and the value of the previously extracted block size information is greater than a preset second threshold value, the step reverts to step Q5 in which a transmission power decrease signal is transmitted (decreasing request 40 in the timing chart of FIG. 19) in one unit to the mobile communication terminal 11 via the transmission power decreasing section 23a and the transmitting section 18.

In the thus configured transmission power control apparatus of the mobile communication terminal according to the fourth embodiment, as shown in FIG. 19, during 500 ms from a time point at which one transmission power decreasing request 42 is delivered to the mobile communication terminal 11, to a time point at which a next transmission power decreasing request 42 is delivered, for example, 50 items of block size information $D_1$-$D_{50}$ are extracted, and block size information that corresponds to such one transmission power decreasing request 42 is determined from these 50 items of block size information $D_1$-$D_{50}$. Thus, for example, it is prevented to detect the maximum output power state based on incorrect E-TFCI 43 caused by factors such as a data error that has occurred due to noises or the like, for example.

Further, the mobile communication terminal 11 may be established in a transient state from receipt of the transmission power decreasing request 42 to determination of a transmission power value (block size). In this case as well, one item of block size information is determined by means of the processing operation described previously from a plurality of received block size information, thus making it possible to improve reliability more remarkably.

The present invention is not limited to the fourth embodiment. While, in the fourth embodiment, 50 items of block size information $D_1$-$D_{50}$ have been allowed to take any of digital two values, it may be thought that a value changes in the vicinity of each of the small and large two values, as described later.

Therefore, it is possible to change the processing operations of steps Q6c and Q6d in the flow chart of FIG. 18 as follows.

In step Q6c, the preliminary extracting section 51b extracts, as a first reference value $D_{S1}$, the minimum value in 50 items of block size information $D_1$-$D_{50}$ and extracts the maximum value as a second reference value $D_{S2}$.

Next, the ratio calculating section 51c counts the number $B_{S2}$ of block size information serving as a value equal to the second reference value $D_{S2}$ and a value within a predetermined numeric value range with respect to the second reference value $D_{S2}$ (step Q6d) and calculates a ratio ($B_{S2}/B_{AL}$) of the number $B_{S2}$ of block size information of the second reference value $D_{S2}$ to the number $B_{AL}$ of all block size information (step Q6e).

With this configuration, even in the case where the block size information $D_1$-$D_{50}$ changes by one point as described later, the present invention can be sufficiently applied.

In the fourth embodiment, the receiving section 19 of FIG. 12 may be employed instead of the receiving section 51a in the block size extracting section 25b.

Next, with reference to FIGS. 22, 23, and 24, a description will be given about a reason why number of E-TFCI of the control channel E-DPCCH (block size information) changes, the number being included in the uplink signal to be transmitted from the mobile communication terminal 11 to the simulative base station unit 12 (transmission power control apparatus 17).

Figure 22:
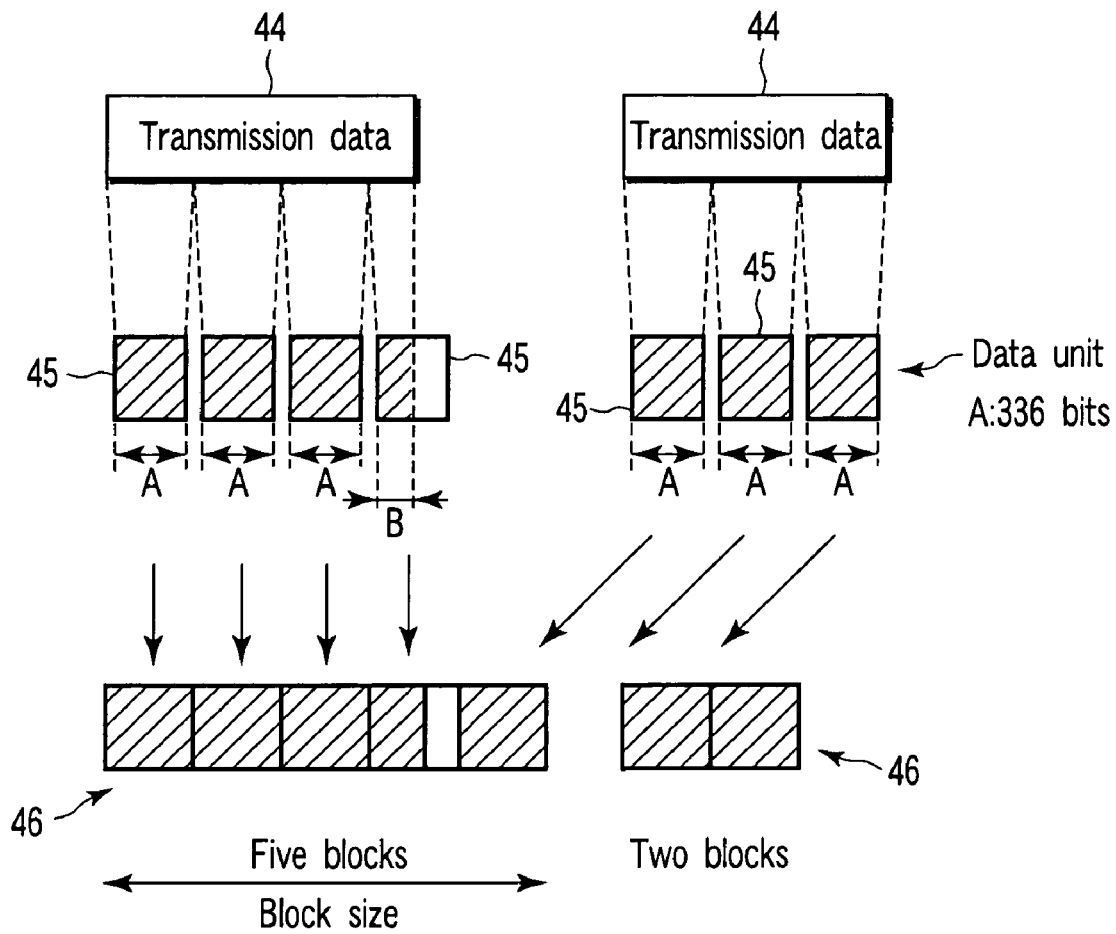
FIG. 22 is a schematic view shown for explaining advantageous effects of the transmission power control apparatuses according to the third and fourth embodiments, to which the present invention is applied.

As shown in FIG. 22, the mobile communication terminal 11 divides transmission data 44 to be transmitted, to a data unit 45 having a bit length A that can be selected in accordance with the standard (336 bits in the present embodiment).

Therefore, a complete data unit 45 having a 366-bit length and a data unit 45 of a data length B that is smaller than 336-bit length exist in the data unit.

Thus, a data length of transmission data to be transmitted is obtained as (nA+B) where "n" is defined as an integer.

The mobile communication terminal 11 incorporates one or a plurality of data units 45 as one block 46 into the data channel E-DPDCH of the uplink signal.

The code corresponding to a bit length (block size) of such one block 46 is incorporated in E-TFCI of the control channel E-DPCCH.

On the other hand, as shown in the table of FIG. 23, a plurality of discontinuous block sizes 48 are set within the range such that a power ratio ($\beta$ed/$\beta$c) of each of the maximum transmission powers of E-DPDCH specified by the control channel E-AGCH of the downlink signal of the simulative base station unit 12 (transmission power control apparatus 17) does not exceed a required power ratio ($\beta$ed/$\beta$c in the table) indicating the minimum power ratio required for this data block transmission.

An E-TFCI code 47 is set to each of the block sizes 48.

Further, the number of data units included in the block sizes 48 is set to each of the block sizes 48.

For example, in the case where the maximum power ratio ($\beta$ed/$\beta$c)=21/15 is given, the block size 48 up to 1264, E-TFCI code 47 up to 59, and the number of data units up to 3 can be selected.

The mobile communication terminal 11 can select any block size 48 from these selectable block sizes 48, and selects the minimum block size 48 in which the maximum number of data units set at the mobile communication terminal 11 can be obtained in consideration of transmission efficiency.

Therefore, in the present embodiment, the block size 48 (E-TFCI code 47=54 and the number of data units=3) of 1032 indicated by the arrow is selected.

Similarly, the block size 48 (E-TFCI code 47 and the number of data units) employed by the mobile communication terminal 11, depending on a difference in maximum power ratio ($\beta$ed/$\beta$c), is indicated by the arrow.

Here, in the case where transmission power is increased by one unit, and the maximum power state is established, the mobile communication terminal 11 cannot output power of E-DPDCH by means of the set maximum power ratio, and the power ratio is lowered.

According to the example described previously, $\beta$ed/$\beta$c=21/15 cannot be obtained, the minimum data block size 48 in which the maximum number of data units can be obtained is selected, so that the selected power ratio is obtained as 17/15 in the table and E-TFCI code 47 is obtained as 45.

The mobile communication terminal 11 receives the table 39 shown in FIG. 5 from a base station (transmission power control apparatus 17), and interpolates and calculates the $\beta$ed/$\beta$c value relative to all of E-TFCI codes (numbers) 47 in proportional to the data block size 48 based on this received table (FIG. 24A).

At this time, the $\beta$ed/$\beta$c value relative to each of the E-TFCI codes (numbers) 47 is associated so as not to exceed a value defined in accordance with the standard shown in a Quantized Aed value in FIG. 24A. The Quantized Aed value may be obtained as an irrational number, and the association with the E-TFCI code (number) 47 may be different by one level depending on a rounding error.

In other words, a combination of each of the E-TFCI codes (numbers) 47 and the value of the maximum power ratio ($\beta$ed/$\beta$c) may be changed.

Therefore, a table in which a change point of the ($\beta$ed/$\beta$c) value is different from that in the table of FIG. 23 may be produced.

The E-TFCI code (number) 47 is determined based on this table, and thus, the E-TFCI code (number) 47 that the mobile communication terminal 11 can take may also be changed.

However, this change is caused by an error that occurs at the time of rounding described previously, and thus, the E-TFCI code (number) 47 changes by in only one unit.

In addition, in the case where additional information on SI (Scheduling Information) defined in the standard in order to convey the situation of the mobile communication terminal 11 to a base station (transmission power control apparatus 17) is incorporated in the data unit 45 as well, the block size increases so that the E-TFCI code (number) 47 may change by one unit.

A phenomenon that the E-TFCI code (number) 47 of such E-DPCCH changes by one unit is different from a change in E-TFCI code (number) 47 in control for the maximum transmission power state, thus making it necessary to isolate these factors from each other and take appropriate countermeasures.

As described above in detail, according to the present invention, it becomes possible to provide a transmission power control method and apparatus of a mobile communication terminal, which can solve the problems associated with related art and measure, in a short period of time and precisely, a state of the maximum output power set at the mobile communication terminal in a state in which a transmission power ratio between physical channels has been specified at the mobile communication terminal.

What is claimed is:

1. A transmission power control method of a mobile communication terminal, in a communication approach for controlling total power of transmission power of each of a plurality of physical channels output from the mobile communication terminal which exchanges information on the plurality of physical channels with a base station using a code division multiple access by adjusting a block size of data that can be transmitted by means of predetermined specific physical channels so as not to exceed a predetermined maximum output power, for setting an output state of transmission power from the mobile communication terminal at the predetermined maximum output power by means of a testing instrument connected to the mobile communication terminal in place of the base station, the method comprising:

a use channel setting step of transmitting and setting, from the testing instrument to the mobile communication terminal, types of the plurality of physical channels to be transmitted from the mobile communication terminal to the testing instrument;

a transmission power ratio setting step of transmitting and setting, from the testing instrument to the mobile communication terminal, transmittable maximum transmission power of a predetermined first physical channel from among the plurality of physical channels transmitted from the mobile communication terminal, and transmitting and setting, from the testing instrument to the mobile communication terminal, a ratio of transmission power between each of physical channels other than the first physical channel from among the plurality of physical channels transmitted from the mobile communication terminal;

a communication establishing step of establishing communication between the testing instrument and the mobile communication terminal in the testing instrument, and transmitting and setting, from the testing instrument to the mobile communication terminal, transmission power so as to be a non-maximum transmission power state preset in the mobile communication terminal;

a transmission power increasing step of continuously transmitting, from the testing instrument to the mobile communication terminal at predetermined intervals, a transmission power increasing request for increasing transmission power of the mobile communication terminal by predetermined quantity from the non-maximum transmission power;

a block size extracting step of receiving, by means of the testing instrument, the plurality of physical channels from the mobile communication terminal relative to each transmission of the transmission power increasing request at the predetermined intervals of the transmission power increasing step, and extracting, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage step of storing at least one time, the block size information extracted at the block size extracting step in the testing instrument; and a maximum output power state determining step of, in the case where a value of newly extracted block size information in the block size extracting step is decreased below a value of immediately preceding block size information stored in the storage step as a result of comparing the value of the newly extracted block size information with the value of the immediately preceding block size information stored in the storage step, stopping transmission of the transmission power increasing request in the transmission power increasing step, and transmitting, to the mobile communication terminal, a transmission power decreasing request for decreasing transmission power of the mobile communication terminal by a predetermined quantity.

2. The transmission power control method of a mobile communication terminal according to claim 1, wherein the block size extracting step comprises:

a receiving step of receiving a plurality of times a plurality of physical channels including the second physical channel in transmission intervals of each of transmission power increasing requests that are continuously transmitted at the predetermined intervals;

a preliminary extracting step of extracting the block size information respectively from the second physical channel included in the plurality of physical channels received a plurality of times in the receiving step, the extracted block size information each having any of predetermined two values, a smaller value being defined as a first reference value among the predetermined two values, the other value being defined as a second reference value;

a ratio calculating step of calculating a ratio between a total number of the block size information extracted in the preliminary extracting step and the number of block size information that is a value equal to the first reference value; and a determining step of, when the ratio calculated in the ratio calculating step is greater than a predetermined first threshold value, determining the first reference value as block size information extracted with respect to the transmission power increasing request, and when the ratio calculated in the ratio calculating step is equal to or smaller than the first threshold value, determining the second reference value as block size information extracted with respect to the transmission power increasing request.

3. The transmission power control method of a mobile communication terminal according to claim 1, wherein the block size extracting step comprises:

a receiving step of receiving a plurality of times a plurality of physical channels including the second physical channel in transmission intervals of each of transmission power increasing requests that are continuously transmitted at the predetermined intervals;

a preliminary extracting step of extracting the block size information respectively from the second physical channel included in the plurality of physical channels received a plurality of times in the receiving step, defining, as a first reference value, a minimum value of each of the extracted block size information, and defining, as a second reference value, a maximum value of each of the extracted block size information;

a ratio calculating step of calculating a ratio between a total number of the block size information extracted in the preliminary extracting step and the number of block size information that is a value equal to the first reference value or a value within a predetermined numeric value range relative to the first reference value; and a determining step of, when the ratio calculated in the ratio calculating step is greater than a predetermined first threshold value, determining the first reference value as block size information extracted with respect to the transmission power increasing request, and when the ratio calculated in the ratio calculating step is equal to or smaller than the first threshold value, determining the second reference value as block size information extracted with respect to the transmission power increasing request.

4. The transmission power control method of a mobile communication terminal according to claim 1, wherein, in the case where a value of the newly extracted block size information is decreased significantly below a predetermined second threshold value in comparison with a value of the immediately preceding block size information stored in the storage step, the maximum output power state determining step stops transmission of the transmission power increasing request in the transmission power increasing step and transmits, to the mobile communication terminal, the transmission power decreasing request for decreasing the transmission power of the mobile communication terminal by a predetermined quantity.

5. A transmission power control method of a mobile communication terminal, in a communication approach for controlling total power of transmission power of each of a plurality of physical channels output from the mobile communication terminal which exchanges information on the plurality of physical channels with a base station using a code division multiple access by adjusting a block size of data that can be transmitted by means of predetermined specific physical channels so as not to exceed a predetermined maximum output power, for setting an output state of transmission power from the mobile communication terminal at the predetermined maximum output power by means of a testing instrument connected to the mobile communication terminal in place of the base station, the method comprising:

- a use channel setting step of transmitting and setting, from the testing instrument to the mobile communication terminal, types of the plurality of physical channels to be transmitted from the mobile communication terminal to the testing instrument;
- a transmission power ratio setting step of transmitting and setting, from the testing instrument to the mobile communication terminal, transmittable maximum transmission power of a predetermined first physical channel from among the plurality of physical channels transmitted from the mobile communication terminal, and transmitting and setting, from the testing instrument to the mobile communication terminal, a ratio of transmission power between each of physical channels other than the first physical channel from among the plurality of physical channels transmitted from the mobile communication terminal;
- a communication establishing step of establishing communication between the testing instrument and the mobile communication terminal in the testing instrument;
- an excessively large adjustment state setting step of providing initial setting to an excessively large adjustment state in which adjustment is made with respect to transmission power of the each of the physical channels in a state in which total power of the transmission power has reached the predetermined maximum output power;
- a transmission power decreasing step of continuously transmitting, from the testing instrument to the mobile communication terminal at predetermined intervals, a transmission power decreasing request for decreasing transmission power of the mobile communication terminal by a predetermined quantity from the excessively large adjustment state;
- a block size extracting step of receiving, by means of the testing instrument, the plurality of physical channels from the mobile communication terminal relative to each transmission of the transmission power decreasing request at the predetermined intervals of the transmission power decreasing step, and extracting, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;
- a storage step of storing, at least one time, the block size information extracted in the block size extracting step in the testing instrument;
- a block size information judging step of judging whether or not a value of newly extracted block size information in the block size extracting step exceeds a preset value in the testing instrument; and
- a maximum output power state determining step of, in the case where the value of the newly extracted block size information exceeds the preset value in the block size information judging step, comparing the value of the newly extracted block size information with a value of immediately preceding block size information stored in the storage step, and in the case where the value of the newly extracted block size information is equal to the value of the immediately preceding block size information stored in the storage step, stopping transmission of the transmission power decreasing request in the transmission power decreasing step, and transmitting, to the mobile communication terminal, a transmission power increasing request for increasing transmission power of the mobile communication terminal by a predetermined quantity.

6. The transmission power control method of a mobile communication terminal according to claim 5, wherein the block size extracting step comprises:

- a receiving step of receiving a plurality of times a plurality of physical channels including the second physical channel in transmission intervals of each of transmission power decreasing requests that are continuously transmitted at the predetermined intervals;
- a preliminary extracting step of extracting the block size information respectively from the second physical channel included in the plurality of physical channels received a plurality of times in the receiving step, the extracted block size information each having any of predetermined two values, a smaller value being defined as a first reference value among the predetermined two values, the other value being defined as a second reference value;
- a ratio calculating step of calculating a ratio between a total number of the block size information extracted in the preliminary extracting step and the number of block size information that is a value equal to the second reference value; and
- a determining step of, when the ratio calculated in the ratio calculating step is greater than a predetermined first threshold value, determining the second reference value as block size information extracted with respect to the transmission power decreasing request, and when the ratio calculated in the ratio calculating step is equal to or smaller than the first threshold value, determining the first reference value as block size information extracted with respect to the transmission power decreasing request.

7. The transmission power control method of a mobile communication terminal according to claim 5, wherein the block size extracting step comprises:

- a receiving step of receiving a plurality of times a plurality of physical channels including the second physical channel in transmission intervals of each of transmission power decreasing requests that are continuously transmitted at the predetermined intervals;
- a preliminary extracting step of extracting the block size information respectively from the second physical channel included in the plurality of physical channels received a plurality of times in the receiving step, defining, as a first reference value, a minimum value of each of the extracted block size information, and defining, as a second reference value, a maximum value of each of the extracted block size information;

a ratio calculating step of calculating a ratio between a total number of the block size information extracted in the preliminary extracting step and the number of block size information that is a value equal to the second reference value or a value within a predetermined numeric value range relative to the second reference value; and a determining step of, when the ratio calculated in the ratio calculating step is greater than a predetermined first threshold value, determining the second reference value as block size information extracted with respect to the transmission power decreasing request, and when the ratio calculated in the ratio calculating step is equal to or smaller than the first threshold value, determining the first reference value as block size information extracted with respect to the transmission power decreasing request.

8. The transmission power control method of a mobile communication terminal according to claim 5, wherein, in the case where the value of the newly extracted block size information is within a range of the value of the immediately preceding block size information stored in the storage step and a predetermined second threshold value, the maximum output power state determining step stops transmission of the transmission power decreasing request in the transmission power decreasing step and transmits, to the mobile communication terminal, a transmission power increasing request for increasing transmission power of the mobile communication terminal by a predetermined quantity.

9. The transmission power control method of a mobile communication terminal according to claim 1, wherein the communication approach is W-CDMA.

10. The transmission power control method of a mobile communication terminal according to claim 9, wherein the plurality of physical channels output from the mobile communication terminal include at least DPCCH, E-DPCCH, and E-DPDCH.

11. The transmission power control method of a mobile communication terminal according to claim 10, wherein the first physical channel is the E-DPDCH and the second physical channel is the E-DPCCH.

12. The transmission power control method of a mobile communication terminal according to claim 10, wherein the block size information is E-TFCI (transfer quantity information) included in the E-DPCCH.

13. The transmission power control method of a mobile communication terminal according to claim 10, wherein the transmission power increasing request and the transmission power decreasing request are instructed by means of TPC bits included in DPCCH of a downlink or F-DPCH of the downlink, which is transmitted from the testing instrument to the mobile communication terminal.

14. A transmission power control apparatus of a mobile communication terminal, in a communication approach for controlling total power of transmission power of each of a plurality of physical channels output from the mobile communication terminal which exchanges information on the plurality of physical channels with a base station using a code division multiple access by adjusting a block size of data that can be transmitted by means of predetermined specific physical channels so as not to exceed a predetermined maximum output power, for setting an output state of transmission power from the mobile communication terminal at the predetermined maximum output power by means of a testing instrument connected to the mobile communication terminal in place of the base station, the apparatus comprising:

a use channel setting section which transmits and sets, from the testing instrument to the mobile communication terminal, types of the plurality of physical channels to be transmitted from the mobile communication terminal to the testing instrument;

a maximum transmission power setting section which transmits and sets, from the testing instrument to the mobile communication terminal, transmittable maximum transmission power of a predetermined first physical channel from among the plurality of physical channels transmitted from the mobile communication terminal;

a transmission power ratio setting section which transmits and sets, from the testing instrument to the mobile communication terminal, a ratio of transmission power between each of physical channels other than the first physical channel from among the plurality of physical channels transmitted from the mobile communication terminal;

a communication establishing section which establishes communication between the testing instrument and the mobile communication terminal, and transmits and sets, from the testing instrument to the mobile communication terminal, transmission power so as to be a non-maximum transmission power state preset in the mobile communication terminal;

a transmission power increasing section which continuously transmits, from the testing instrument to the mobile communication terminal at predetermined intervals, a transmission power increasing request for increasing transmission power of the mobile communication terminal by a predetermined quantity from the non-maximum transmission power state;

a block size extracting section which receives the plurality of physical channels from the mobile communication terminal relative to each transmission of the transmission power increasing request at the predetermined intervals of the transmission power increasing section, and extracts, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage section which stores, at least one time, the block size information extracted at the block size extracting section; and a maximum output power state determining section which, in the case where a value of newly extracted block size information is decreased below a value of immediately preceding block size information stored in the storage section as a result of comparison between the value of the newly extracted block size information in the block size extracting section and the value of the immediately preceding block size information stored in the storage section, stops transmission of the transmission power increasing request at the transmission power increasing section and transmits, to the mobile communication terminal, a transmission power decreasing request for decreasing transmission power of the mobile communication terminal by a predetermined quantity.

15. The transmission power control apparatus of a mobile communication terminal according to claim 14, wherein the block size extracting section comprises:

a receiving section which receives a plurality of times a plurality of physical channels including the second physical channel in transmission intervals of each of transmission power increasing requests that are continuously transmitted at the predetermined intervals;

a preliminary extracting section which extracts the block size information respectively from the second physical channel included in the plurality of physical channels received a plurality of times in the receiving section, the extracted block size information each having any of predetermined two values, a smaller value being defined as a first reference value among the predetermined two values, the other value being defined as a second reference value;

a ratio calculating section which calculates a ratio between a total number of the block size information extracted in the preliminary extracting section and the number of block size information that is a value equal to the first reference value; and a determining section which, when the ratio calculated in the ratio calculating section is greater than a predetermined first threshold value, determines the first reference value as block size information extracted with respect to the transmission power increasing request, and when the ratio calculated in the ratio calculating section is equal to or smaller than the first threshold value, determines the second reference value as block size information extracted with respect to the transmission power increasing request.

16. The transmission power control apparatus of a mobile communication terminal according to claim 14, wherein the block size extracting section comprises:

a receiving section which receives a plurality of times a plurality of physical channels including the second physical channel in transmission intervals of each of transmission power increasing requests that are continuously transmitted at the predetermined intervals;

a preliminary extracting section which extracts the block size information respectively from the second physical channel included in the plurality of physical channels received a plurality of times in the receiving section, defines, as a first reference value, a minimum value of each of the extracted block size information, and defines, as a second reference value, a maximum value of each of the extracted block size information;

a ratio calculating section which calculates a ratio between a total number of block size information extracted in the preliminary extracting section and the number of block size information that is a value equal to the first reference value or a value within a predetermined numeric value range relative to the first reference value; and a determining section which, when the ratio calculated in the ratio calculating section is greater than a predetermined first threshold value, determines the first reference value as block size information extracted with respect to the transmission power increasing request, and when the ratio calculated in the ratio calculating section is equal to or smaller than the first threshold value, determines the second reference value as block size information extracted with respect to the transmission power increasing request.

17. The transmission power control apparatus of a mobile communication terminal according to claim 14, wherein, in the case where the value of the newly extracted block size information is decreased significantly below a predetermined second threshold value in comparison with the value of the immediately preceding block size information stored in the storage section, the maximum output power state determining section stops transmission of the transmission power increasing request in the transmission power increasing section and transmits, to the mobile communication terminal, the transmission power decreasing request for decreasing transmission power of the mobile communication terminal by a predetermined quantity.

18. A transmission power control apparatus of a mobile communication terminal, in a communication approach for controlling total power of transmission power of each of a plurality of physical channels output from the mobile communication terminal which exchanges information on the plurality of physical channels with a base station using a code division multiple access by adjusting a block size of data that can be transmitted by means of predetermined specific physical channels so as not to exceed a predetermined maximum output power, for setting an output state of transmission power from the mobile communication terminal at the predetermined maximum output power by means of a testing instrument connected to the mobile communication terminal in place of the base station, the apparatus comprising:

a use channel setting section which transmits and sets, from the testing instrument to the mobile communication terminal, types of the plurality of physical channels to be transmitted from the mobile communication terminal to the testing instrument;

a maximum transmission power setting section which transmits and sets, from the testing instrument to the mobile communication terminal, transmittable maximum transmission power of a predetermined first physical channel from among the plurality of physical channels transmitted from the mobile communication terminal;

a transmission power ratio setting section which transmits and sets, from the testing instrument to the mobile communication terminal, a ratio of transmission power between each of physical channels other than the first physical channel from among the plurality of physical channels transmitted from the mobile communication terminal;

a communication establishing section which establishes communication between the testing instrument and the mobile communication terminal;

an excessively large adjustment state setting section which provides initial setting to an excessively large adjustment state in which adjustment is made with respect to transmission power of the each of the physical channels in a state in which total power of the transmission power has reached the predetermined maximum output power;

a transmission power decreasing section which continuously transmits, from the testing instrument to the mobile communication terminal at predetermined intervals, a transmission power decreasing request for decreasing transmission power of the mobile communication terminal by a predetermined quantity from the excessively large adjustment state;

a block size extracting section which receives the plurality of physical channels from the mobile communication terminal relative to each transmission of the transmission power decreasing request at the predetermined intervals of the transmission power decreasing section, and extracts, from a predetermined second physical channel, block size information indicating a block size of transmittable data determined by the predetermined maximum output power, the transmittable maximum transmission power set at the first physical channel, and total power of transmission power of the each of the physical channels other than the first physical channel from among the plurality of physical channels;

a storage section which stores, at least one time, the block size information extracted in the block size extracting section;

a maximum output power state determining section which judges whether or not a value of newly extracted block size information in the block size extracting section exceeds a preset value, and in the case where the value of the newly extracted block size information exceeds the preset value, compares the value of the newly extracted block size information with a value of immediately preceding block size information stored in the storage section, and in the case where the value of the newly extracted block size information is equal to the value of the immediately preceding block size information stored in the storage section, stops transmission of the transmission power decreasing request in the transmission power decreasing section and transmits, to the mobile communication terminal, a transmission power increasing request for increasing transmission power of the mobile communication terminal by a predetermined quantity.

19. The transmission power control apparatus of a mobile communication terminal according to claim 18, wherein the block size extracting section comprises:

a receiving section which receives a plurality of times a plurality of physical channels including the second physical channel in transmission intervals of transmission each of power decreasing requests that are continuously transmitted at the predetermined intervals;

a preliminary extracting section which extracts the block size information respectively from the second physical channel included in the plurality of physical channels received a plurality of times in the receiving section, the extracted block size information each having any of predetermined two values, a smaller value being defined as a first reference value among the predetermined two values, the other value being defined as a second reference value;

a ratio calculating section which calculates a ratio between a total number of the block size information extracted in the preliminary extracting section and the number of block size information that is a value equal to the second reference value; and a determining section which, when the ratio calculated in the ratio calculating section is greater than a predetermined first threshold value, determines the second reference value as block size information extracted with respect to the transmission power decreasing request, and when the ratio calculated in the ratio calculating section is equal to or smaller than the first threshold value, determines the first reference value as block size information extracted with respect to the transmission power decreasing request.

20. The transmission power control apparatus of a mobile communication terminal according to claim 18, wherein the block size extracting section comprises:

a receiving section which receives a plurality of times a plurality of physical channels including the second physical channel in transmission intervals of transmission each of power decreasing requests that are continuously transmitted at the predetermined intervals;

a preliminary extracting section which extracts the block size information respectively from the second physical channel included in the plurality of physical channels received a plurality of times in the receiving section, defines, as a first reference value, a minimum value of each of the extracted block size information, and defines, as a second reference value, a maximum value of each of the extracted block size information;

a ratio calculating section which calculates a ratio between a total number of block size information extracted in the preliminary extracting section and the number of block size information that is a value equal to the second reference value or a value within a predetermined numeric value range relative to the second reference value; and a determining section which, when the ratio calculated in the ratio calculating section is greater than a predetermined first threshold value, determines the second reference value as block size information extracted with respect to the transmission power decreasing request, and when the ratio calculated in the ratio calculating section is equal to or smaller than the first threshold value, determines the first reference value as block size information extracted with respect to the transmission power decreasing request.

21. The transmission power control apparatus of a mobile communication terminal according to claim 18, wherein, in the case where the value of the newly extracted block size information is within a range of the value of the immediately preceding block size information stored in the storage section and a predetermined second threshold value, the maximum output power state determining section stops transmission of the transmission power decreasing request in the transmission power decreasing section and transmits, to the mobile communication terminal, a transmission power increasing request for increasing transmission power of the mobile communication terminal by a predetermined quantity.

22. The transmission power control method of a mobile communication terminal according to claim 2, wherein the communication approach is W-CDMA.

23. The transmission power control method of a mobile communication terminal according to claim 22, wherein the plurality of physical channels output from the mobile communication terminal include at least DPCCH, E-DPCCH, and E-DPDCH.

24. The transmission power control method of a mobile communication terminal according to claim 23, wherein the first physical channel is the E-DPDCH and the second physical channel is the E-DPCCH.

25. The transmission power control method of a mobile communication terminal according to claim 23, wherein block size information is E-TFCI (transfer quantity information) included in the E-DPCCH.

26. The transmission power control method of a mobile communication terminal according to claim 23, wherein the transmission power increasing request and the transmission power decreasing request are instructed by means of TPC bits included in DPCCH of a downlink or F-DPCH of the downlink, which is transmitted from the testing instrument to the mobile communication terminal.

27. The transmission power control method of a mobile communication terminal according to claim 3, wherein the communication approach is W-CDMA.

28. The transmission power control method of a mobile communication terminal according to claim 27, wherein the plurality of physical channels output from the mobile communication terminal include at least DPCCH, E-DPCCH, and E-DPDCH.

29. The transmission power control method of a mobile communication terminal according to claim 28, wherein the first physical channel is the E-DPDCH and the second physical channel is the E-DPCCH.

30. The transmission power control method of a mobile communication terminal according to claim 28, wherein the block size information is E-TFCI (transfer quantity information) included in the E-DPCCH.

31. The transmission power control method of a mobile communication terminal according to claim 28, wherein the transmission power increasing request and the transmission power decreasing request are instructed by means of TPC bits included in DPCCH of a downlink or F-DPCH of the downlink, which is transmitted from the testing instrument to the mobile communication terminal.

32. The transmission power control method of a mobile communication terminal according to claim 4, wherein the communication approach is W-CDMA.

33. The transmission power control method of a mobile communication terminal according to claim 32, wherein the plurality of physical channels output from the mobile communication terminal include at least DPCCH, E-DPCCH, and E-DPDCH.

34. The transmission power control method of a mobile communication terminal according to claim 33, wherein the first physical channel is the E-DPDCH and the second physical channel is the E-DPCCH.

35. The transmission power control method of a mobile communication terminal according to claim 33, wherein the block size information is E-TFCI (transfer quantity information) included in the E-DPCCH.

36. The transmission power control method of a mobile communication terminal according to claim 33, wherein the transmission power increasing request and the transmission power decreasing request are instructed by means of TPC bits included in DPCCH of a downlink or F-DPCH of the downlink, which is transmitted from the testing instrument to the mobile communication terminal.

37. The transmission power control method of a mobile communication terminal according to claim 5, wherein the communication approach is W-CDMA.

38. The transmission power control method of a mobile communication terminal according to claim 6, wherein the communication approach is W-CDMA.

39. The transmission power control method of a mobile communication terminal according to claim 7, wherein the communication approach is W-CDMA.

40. The transmission power control method of a mobile communication terminal according to claim 8, wherein the communication approach is W-CDMA.

* * * * *